United States Patent
Iizuka et al.

(10) Patent No.: US 9,319,284 B2
(45) Date of Patent: Apr. 19, 2016

(54) OPERATION DELAY MONITORING METHOD, OPERATION MANAGEMENT APPARATUS, AND OPERATION MANAGEMENT PROGRAM

(75) Inventors: Daisuke Iizuka, Yokohama (JP); Takuya Oda, Cambridge, MA (US)

(73) Assignee: HITACHI, LTD., Tokyo (JP)

( * ) Notice: Subject to any disclaimer, the term of this patent is extended or adjusted under 35 U.S.C. 154(b) by 871 days.

(21) Appl. No.: 13/638,177

(22) PCT Filed: Aug. 31, 2010

(86) PCT No.: PCT/JP2010/064778
§ 371 (c)(1),
(2), (4) Date: Jan. 23, 2013

(87) PCT Pub. No.: WO2011/125243
PCT Pub. Date: Oct. 13, 2011

(65) Prior Publication Data
US 2013/0145018 A1    Jun. 6, 2013

(30) Foreign Application Priority Data

Apr. 1, 2010  (JP) ................................ 2010-084732

(51) Int. Cl.
| | |
|---|---|
| H04L 12/26 | (2006.01) |
| G06F 9/46 | (2006.01) |
| G06F 11/07 | (2006.01) |
| G06Q 10/06 | (2012.01) |

(52) U.S. Cl.
CPC ............ H04L 43/00 (2013.01); G06F 11/0757 (2013.01); G06Q 10/063114 (2013.01)

(58) Field of Classification Search
None
See application file for complete search history.

(56) References Cited

U.S. PATENT DOCUMENTS

| | | | | |
|---|---|---|---|---|
| 6,601,035 B1 * | 7/2003 | Panagos | ................ | G06Q 10/06 |
| | | | | 700/100 |
| 2007/0185929 A1* | 8/2007 | Azoulay | ................... | G06F 8/71 |
| 2010/0021027 A1* | 1/2010 | Hartkens | ............... | G06F 19/363 |
| | | | | 382/128 |

FOREIGN PATENT DOCUMENTS

| | | |
|---|---|---|
| JP | 11-96222 A | 4/1999 |
| JP | 2000-210843 A | 8/2000 |
| JP | 2000-322252 A | 11/2000 |
| JP | 2003-256624 A | 9/2003 |
| JP | 2004-185347 A | 7/2004 |
| JP | 2005-071136 A | 3/2005 |
| JP | 2006-199686 A | 5/2006 |
| JP | 2008-204407 A | 9/2008 |
| JP | 2009-48425 A | 3/2009 |

* cited by examiner

*Primary Examiner* — Eric C Wai
(74) *Attorney, Agent, or Firm* — Mattingly & Malur, P.C.

(57) ABSTRACT

A delay in a configuration changing operation of a computer system including a manual procedure and an automatic procedure is detected.
Based on actions of a setup tool or a configuration tool operated on IT resources, an event which occurs corresponding to the start and the end of a manual procedure is detected and the actual time of the manual procedure is calculated from the detection time points. Next, a delay rate is calculated from a scheduled time and the actual time of the manual procedure, and an end time point of an incomplete operation procedure is estimated from an estimated time required for the manual procedure with the calculated delay rate taken into account and from a time required for the automatic procedure to determine whether the scheduled operation will be finished within a period.

16 Claims, 18 Drawing Sheets

FIG. 5

| EVENT ID | TYPE | HOST TYPE | | CHECK PROCEDURE |
|---|---|---|---|---|
| 1 | CREATION OF WINDOW | Windows | WindowClass | StorageDriverInstaller |
|   |   |   | WindowTitle | STORAGE DRIVER & TOOL INSTALLER |
|   |   |   | WindowText | WELCOME |
| 2 | DISAPPEARANCE OF WINDOW | Windows | WindowClass | StorageDriverInstaller |
|   |   |   | WindowTitle | STORAGE DRIVER & TOOL INSTALLER |
|   |   |   | WindowText | INSTALLATION START |
| 3 | CHANGE IN WINDOW MESSAGE | Windows | WindowClass | MessageBox |
|   |   |   | WindowTitle | DISK REPLACEMENT |
|   |   |   | WindowText | SWITCH TO CD-ROM#2 |
| 4 | PRESS OF WINDOW BUTTON | Windows | WindowClass | MessageBox |
|   |   |   | WindowTitle | DISK REPLACEMENT |
|   |   |   | WindowText | SWITCH TO CD-ROM#2 |
|   |   |   | ButtonText | NEXT |
| 5 | Windows EVENT LOG | Windows | type | Warning |
|   |   |   | message | LINK IS DISCONNECTED |
| 6 | SNMP TRAP | NETWORK SWITCH | generic-trap | linkDown(2) RFC1157 |
| 7 | OUTPUT OF LOG FILE | Linux | file | /var/adm/syslog |
|   |   |   | pattern | Accepted password for root |
| 8 | CIM Indication | STORAGE APPARATUS | Indication | CIM_InstCreation |
|   |   |   | Embedded | CIM_StorageVolume |
| 9 | CREATION OF PROCESS | Windows | PROCESS NAME | sp2install.exe |
| 10 | EXECUTION OF COMMAND | Windows | COMMAND NAME | check.exe |
|   |   |   | RETURN CODE | 0 |

FIG. 7

| OPERATION ID | OPERATOR NAME | SCHEDULED START TIME POINT | SCHEDULED END TIME POINT | OPERATION STATUS | OPERATION NAME |
|---|---|---|---|---|---|
| 1 | TEAM A | 2010/4/1 10:00:00 | 2010/4/1 10:50:00 | IN OPERATION | CONSTRUCTION OF NEW DB SERVER |
| 2 | TEAM B | 2010/4/1 10:00:00 | 2010/4/1 10:15:00 | IN OPERATION | SECURITY HOLE MEASURES |
| 3 | TEAM C | 2010/4/2 15:00 | 2010/4/2 16:00 | NOT OPERATED | REPLACEMENT OF NIC |
| 4 | TEAM A | 2010/3/31 12:00:00 | 2010/3/31 17:00:00 | OPERATED | INSTALLATION OF RACK MOUNT SERVER |
| | | | | | |

| OPERATION ID 251 | PROCEDURE ID 252 | PRELIMINARY PROCEDURE ID 253 | MANUAL PROCEDURE START EVENT ID 254 | MANUAL PROCEDURE END EVENT ID 255 | TARGET HOST NAME 256 | MANUAL PROCEDURE SCHEDULED TIME 257 | AUTOMATIC PROCEDURE SCHEDULED TIME 258 | OPERATION DETAILS 259 |
|---|---|---|---|---|---|---|---|---|
| 1 | 101 | NONE | 6 | 16 | netswitch3 | 5:00 | 0:00 | REPLACEMENT OF NETWORK CABLE |
| 1 | 102 | NONE | 12 | 22 | host1 | 10:00 | 0:00 | REPLACEMENT OF FC CABLE |
| 1 | 103 | NONE | 8 | 18 | storage1 | 5:00 | 25:00 | CREATION OF STORAGE LU |
| 1 | 104 | 101 | 1 | 2 | host1 | 5:00 | 5:00 | INSTALLATION OF STORAGE DRIVER |
| 1 | 105 | 104 | 3 | 4 | host1 | 5:00 | 5:00 | INSTALLATION OF STORAGE DRIVER |
| 1 | 106 | 102, 103, 105 | 9 | 19 | host1 | 5:00 | 0:00 | MOUNTING OF STORAGE LU |
| 2 | 201 | NONE | 9 | 19 | host2 | 5:00 | 10:00 | APPLICATION OF OS PATCH |
| | | | | | | | | |

FIG. 9

| PROCEDURE ID | MANUAL PROCEDURE START TIME POINT | MANUAL PROCEDURE END TIME POINT | MANUAL PROCEDURE ACTUAL TIME | MANUAL PROCEDURE DELAY TIME | MANUAL PROCEDURE ESTIMATED TIME |
|---|---|---|---|---|---|
| 101 | 2010/4/1 10:04:20 | 2010/4/1 10:14:25 | 10:05 | 5:05 | |
| 102 | | | | | 16:22 |
| 103 | 2010/4/1 10:01:05 | 2010/4/1 10:08:20 | 7:15 | 2:15 | |
| 104 | 2010/4/1 10:16:47 | | | 2:13 | 7:13 |
| 105 | | | | | 8:11 |
| 106 | | | | | |
| 201 | 2010/4/1 10:00:30 | | | 18:30 | 23:30 |
| | | | | | |

CURRENT TIME POINT 2010/4/1 10:24:00

FIG. 18
(a)
(PROCEDURE ERROR WARNING PROCESS A)
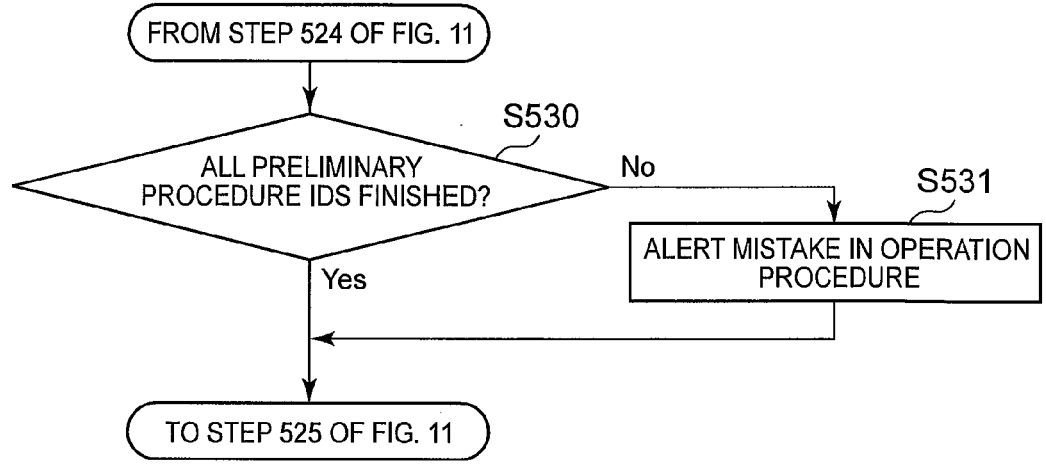
(b)
(PROCEDURE ERROR WARNING PROCESS B)
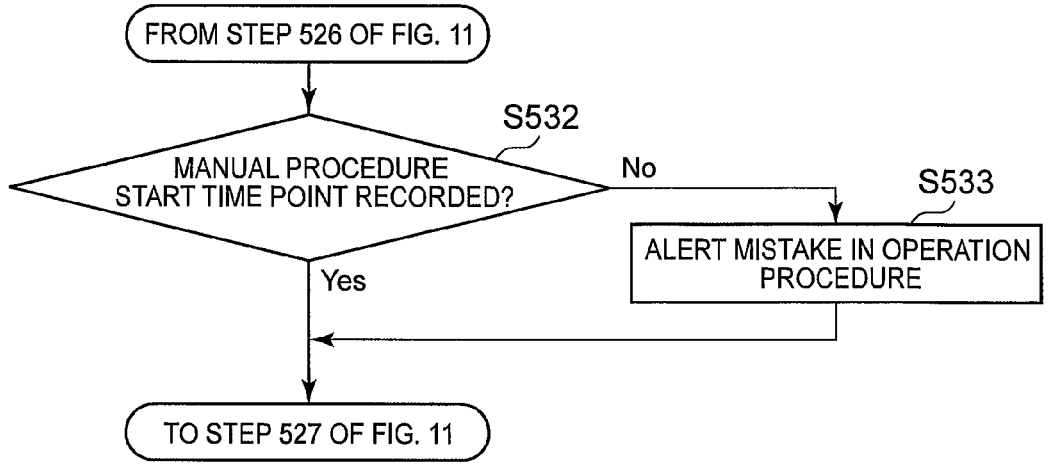

OPERATION DELAY MONITORING METHOD, OPERATION MANAGEMENT APPARATUS, AND OPERATION MANAGEMENT PROGRAM

TECHNICAL FIELD

The present invention relates to a technique for monitoring a delay in a configuration changing operation of a computer system.

BACKGROUND ART

In an operation of a computer system comprising IT (Information Technology) resources, such as a server, a network, and a storage, a configuration changing operation for increasing or updating the IT resources according to a change in the work environment or the like is necessary.

The configuration changing operation includes one or more operation procedures. For example, a series of operation procedures includes delivery and installation of the IT resources at predetermined locations, connection of a power cable and a network cable, installation of necessary software on the server, and initialization of the network and the storage.

The configuration changing operations involve manual operation by an operator. The manual operation may be delayed due to a lack of experience or carelessness of the operator. Therefore, it is important to monitor the progress in the individual operation procedures to figure out whether the configuration changing operation will end within a scheduled time limit.

PTL 1 discloses a conventional technique for monitoring the progress of manual operation, wherein the operator uses a portable computer to transmit a report on the start and the end of the operation process to an operation support apparatus to specify the actual operation time. PTL 2 discloses a technique for receiving maintenance break point information from a portable terminal of maintenance personnel before and after the execution of a test program by a maintenance management server to specify the start and end time points of the maintenance operation.

CITATION LIST

Patent Literature

[PTL 1] Japanese Patent Laid-Open No. 2003-256624
[PTL 2] Japanese Patent Laid-Open No. 2008-204407

SUMMARY OF INVENTION

Technical Problem

However, in the conventional techniques, there is a problem that the operator has to perform a special operation from a portable computer or a portable terminal so that the operation support apparatus and the maintenance management server can figure out the start and the end of manual operation.

Meanwhile, in manual operation for the IT resources, a setup tool is generally activated, or an installed configuration tool is generally used to change the configuration to allow using the IT resources. The setup tool or the configuration tool usually displays a message on a dialog window or a console to notify the operator of the necessity of an operation, such as replacement of a CD-ROM (Compact Disk-Read Only Memory) medium and input of configuration data. However, the tools do not have a function of specifying the start time point or the end time point of the operation as in the conventional techniques. Therefore, there is a problem that the delay in the manual operation cannot be detected.

Furthermore, an advanced setup tool or the like has a function of automatically executing complicated procedures without manpower, just by configuring information, such as parameters and procedures, in advance and launching the setup tool. Hereinafter, a procedure automatically executed by the tool will be called an "automatic procedure", and a procedure other than the automatic procedure will be called a "manual procedure". The automatic procedure is often executed following the manual procedure. Compared to the manual procedure associated with a lack of experience or carelessness of the operator, the automatic procedure is unlikely to be delayed. The conventional techniques have a problem that the operation including the automatic procedure and the manual procedure is not monitored.

An object of the present invention is to solve the problems.

Solution to Problem

A representative example of means for solving the problems is as follows.

First, a checking procedure for detecting the start and the end of a manual procedure is defined in advance based on actions of a setup tool or a configuration tool operated on IT resources or an OS (Operating System). Examples of the actions include creation and disappearance of a window output on a screen, operation of a button on the window, output of an event log by the OS, output of an event log by an application program, output of a message to a console or the like, and creation and disappearance of a process. If an action indicated in the checking procedure occurs on the IT resources, the action is detected as a monitoring target event, and a detection time point is recorded. The detected monitoring target event is compared with the checking procedure to specify a started or finished manual procedure, and the actual time of the manual procedure is calculated from the detection time points. Lastly, a delay rate is estimated from a scheduled time and the actual time of the manual procedure, and an end time point of an incomplete operation procedure is estimated from an estimated time required for the manual procedure with the delay rate taken into account and from a time required for the automatic procedure to determine whether the scheduled operation will be finished within a period.

In the present invention, a dependence relationship in an execution order between operation procedures included in an operation is defined in advance. In this way, when the operator makes a mistake in the operation order, the mistake can be alerted.

Advantageous Effects of Invention

According to the present invention, a delay in a configuration changing operation of a computer system including a manual procedure and an automatic procedure can be detected.

BRIEF DESCRIPTION OF DRAWINGS

FIG. 5 is an example of a data structure and data of a monitoring target event list.

FIG. 7 is an example of a data structure and data of an operation list.

FIG. 8 is an example of a data structure and data of an operation procedure list.

FIG. 9 is an example of a data structure and data of a manual procedure result list.

FIG. 18 is a flow chart showing a flow of an operation procedure error warning process.

DESCRIPTION OF EMBODIMENTS

First Embodiment

Figure 1:
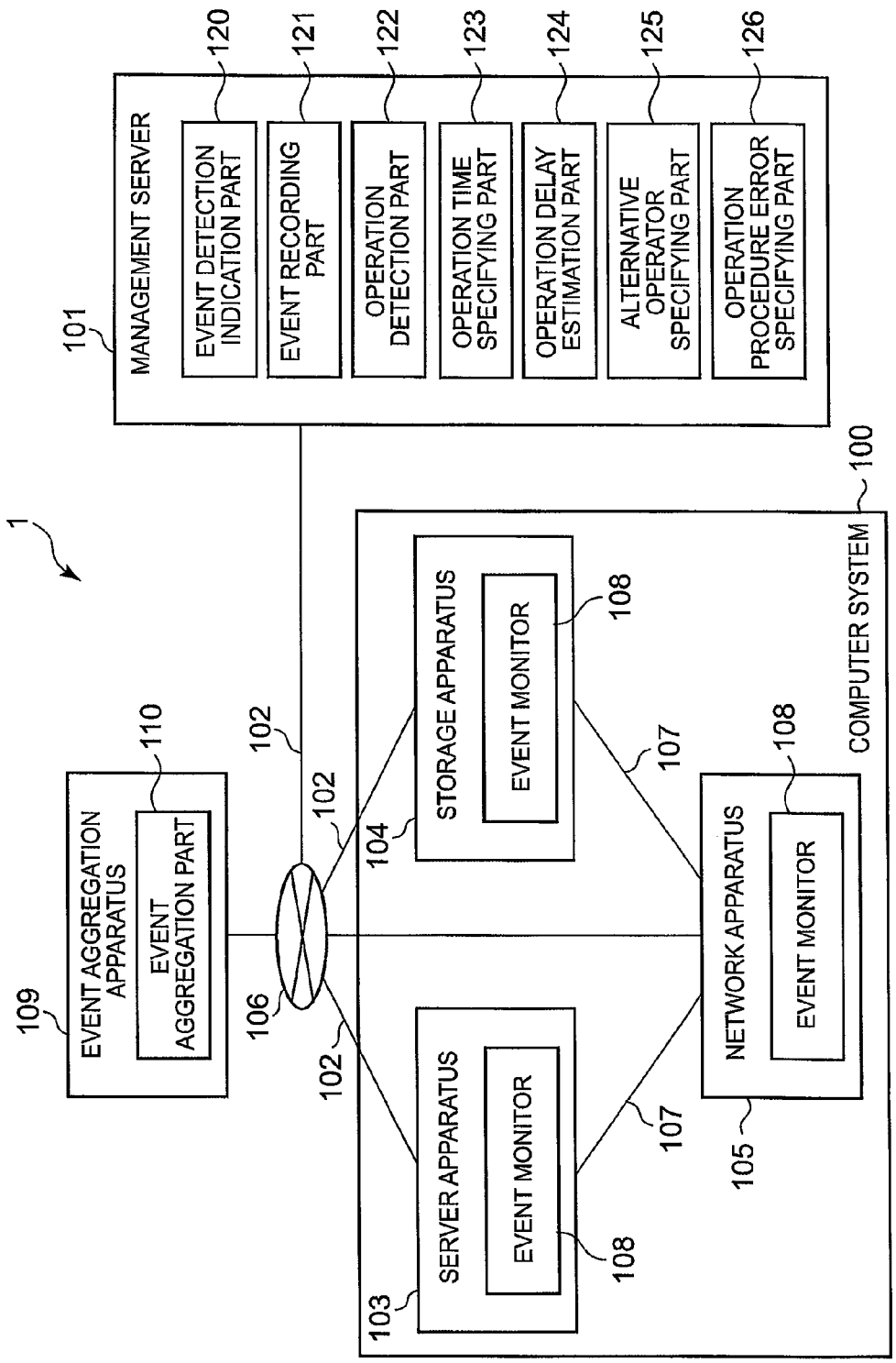
FIG. 1 is a system configuration diagram showing an example of an operation management system.

A first embodiment for carrying out the present invention (hereinafter, called "first embodiment") will now be described with reference to the drawings. FIG. 1 is a system configuration diagram showing an example of an operation management system according to the first embodiment. As shown in FIG. 1, an operation management system 1 comprises a computer system 100, a management server 101, and an event aggregation apparatus 109 as targets of a configuration changing operation.

The computer system 100 comprises a plurality of IT resources, such as a server apparatus 103, a storage apparatus 104, and a network apparatus 105, and provides predetermined IT services to a client apparatus not shown connected through the network apparatus 105.

The management server 101, the event aggregation apparatus 109, the server apparatus 103, the storage apparatus 104, and the network apparatus 105 are connected to a management network 106 through a communication link 102 and can communicate with each other. The server apparatus 103 and the storage apparatus 104 are connected to the network apparatus 105 through a high-speed communication link 107 and can communicate with each other. The communication link 102 and the high-speed communication link 107 are wired or wireless communication means and may also include sub-networks. The management server 101, the server apparatus 103, the storage apparatus 104, and the network apparatus 105 may be connected to the management network 106 or the network apparatus 105 through different systems. The server apparatus 103 and the storage apparatus 104 may be directly connected by wired or wireless communication means, without involving the network apparatus 105.

Although FIG. 1 illustrates a configuration in which the numbers of the management server 101, the event aggregation apparatus 109, the server apparatus 103, the storage apparatus 104, and the network apparatus 105 are one, some of the numbers may be zero or two or more within a range that the operation management system 1 stands up as a system. The management server 101, the event aggregation apparatus 109, the server apparatus 103, the storage apparatus 104, and the network apparatus 105 may be included as virtual machines. Two or more of the management server 101, the event aggregation apparatus 109, the server apparatus 103, the storage apparatus 104, and the network apparatus 105 may be arranged in the same enclosure or in the same virtual machine.

The network apparatus 105 may be further connected to another network apparatus 105 through wired or wireless communication means. The network provided by the network apparatus 105 may be the same as the management network 106. The communication link 102 and the high-speed communication link 107 may be the same.

The management server 101 includes an event detection indication part 120, an event recording part 121, an operation detection part 122, an operation time specifying part 123, an operation delay estimation part 124, an alternative operator specifying part 125, and an operation procedure error specifying part 126. At least one or more of the event detection indication part 120, the event recording part 121, the operation detection part 122, the operation time specifying part 123, the operation delay estimation part 124, the alternative operator specifying part 125, and the operation procedure error specifying part 126 may not exist. The management server 101 will be described in detail later.

Although each of the server apparatus 103, the storage apparatus 104, and the network apparatus 105 of FIG. 1 includes an event monitor 108, the apparatuses may not include the event monitors 108. The event aggregation apparatus 109 includes an event aggregation part 110. The event aggregation part 110 may be on the management server 101.

Figure 2:
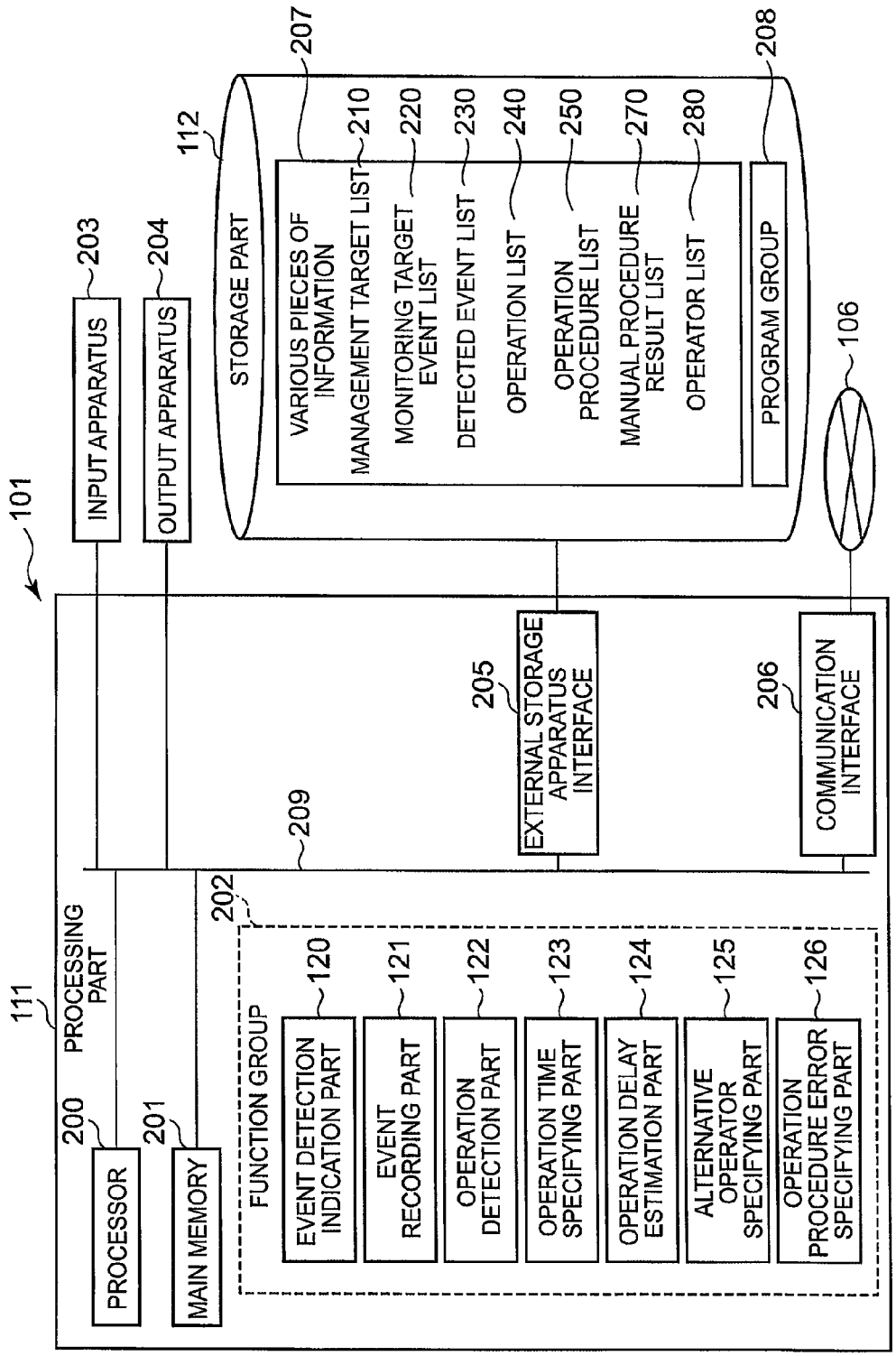
FIG. 2 is a functional block diagram showing an example of a configuration of a management server.

FIG. 2 is a functional block diagram showing an example of a configuration of the management server. As shown in FIG. 2, the management server 101 comprises a processing part 111, an input apparatus 203, an output apparatus 204, and a storage part 112. The processing part 111 comprises a processor 200, a main memory 201, an external storage apparatus interface 205, and a communication interface 206, which are connected through a CPU bus 209 and can communicate with each other. The processor 200 loads a program group 208 stored in the storage part 112, such as a hard disk apparatus, on the main memory 201 to execute the program group 208 to realize a function group 202, such as an event detection indication part 120, an event recording part 121, an operation detection part 122, an operation time specifying part 123, an operation delay estimation part 124, an alternative operator specifying part 125, and an operation procedure error specifying part 126.

In place of the execution of the program group 208 by the processor 200, the event detection indication part 120, the event recording part 121, the operation detection part 122, the operation time specifying part 123, the operation delay estimation part 124, the alternative operator specifying part 125, and the operation procedure error specifying part 126 may be realized by hardware, such as an integrated circuit with functions of the parts. For the simplification of the description, the function parts realized by the execution of the program group 208 loaded on the main memory 201 by the processor 200 will be described as entities of actions of the management server 101.

The external storage apparatus interface 205 is connected to the storage part 112. The storage part 112 may be arranged outside of the management server 101 or may be arranged inside of the management server 101. The storage part 112 holds various pieces of information 207, such as a management target list 210, a monitoring target event list 220, a detected event list 230, an operation list 240, an operation procedure list 250, a manual procedure result list 270, and an operator list 280. At least one or more of the management target list 210, the monitoring target event list 220, the detected event list 230, the operation list 240, the operation procedure list 250, the manual procedure result list 270, and the operator list 280 may not exist. The main memory 201 may hold one or more of the various pieces of information 207 held by the storage part 112. The various pieces of information 207 will be described in detail later with reference to FIGS. 4 to 9.

The communication interface 206 is connected to the management network 106. The communication interface 206 and the external storage apparatus interface 205 may be the same interface.

Figure 3:
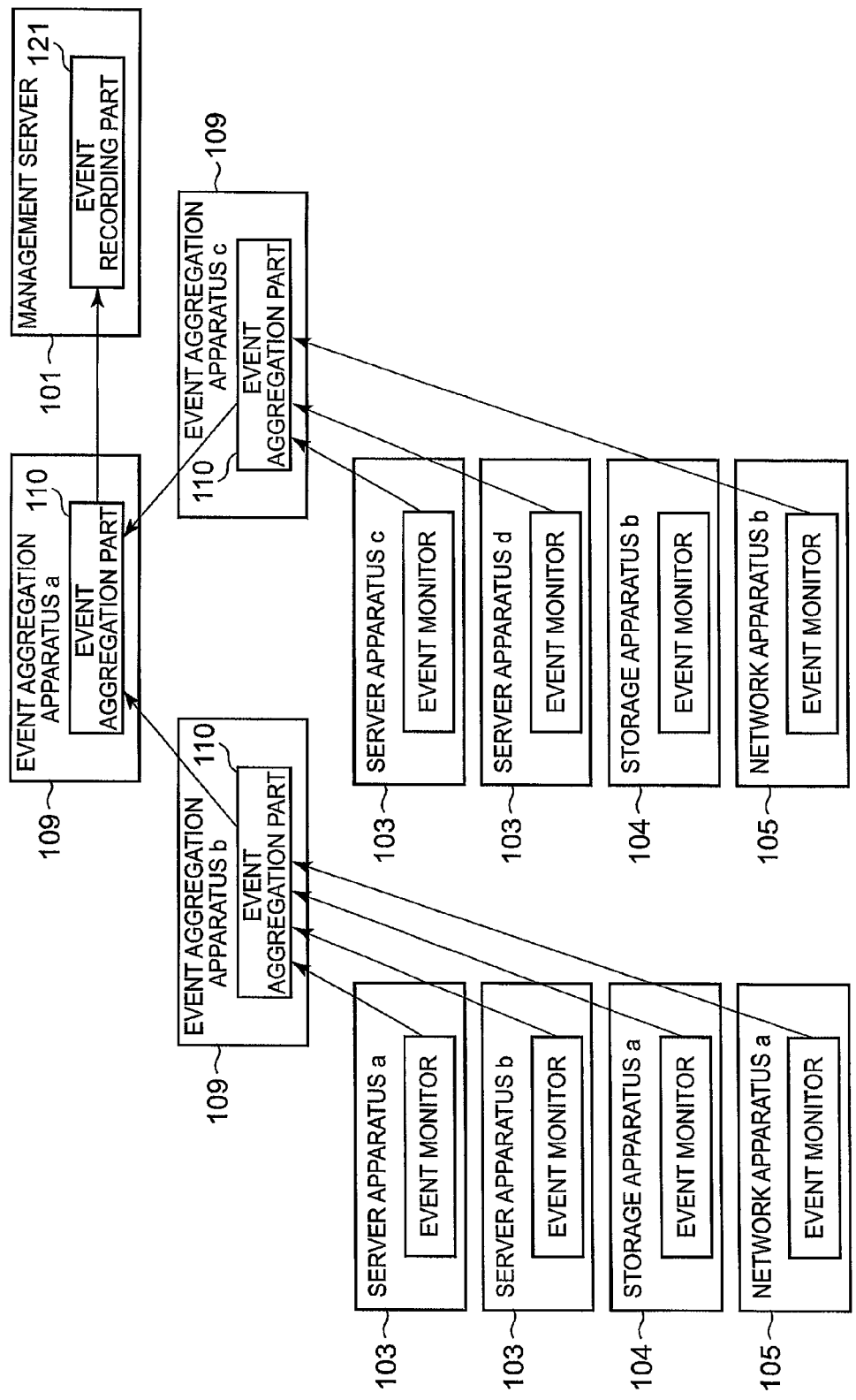
FIG. 3 is s system configuration diagram of the operation management system showing an example of arrangement of event aggregation apparatuses in a layered structure.

FIG. 3 is an explanatory diagram showing a flow of a process of transmitting monitoring target events detected by the event monitors 108 included in the IT resources to the event recording part 121 included in the management server 101 according to the first embodiment. The monitoring target events detected by the event monitors 108 on the server apparatuses 103, the storage apparatuses 104, and the network apparatuses 105 are transmitted to the event aggregation parts 110 included in the event aggregation apparatuses 109. The event aggregation apparatuses 109 have a layered structure, and the monitoring target events transmitted to the event aggregation parts 110 of lower-level event aggregation apparatuses 109 (for example, event aggregation apparatuses b and c of FIG. 3) are transmitted to the event aggregation part 110 of a higher-level event aggregation apparatus 109 (for example, event aggregation apparatus a of FIG. 3). The monitoring target events are transmitted from the event aggregation part 110 of a highest-level event aggregation apparatus 109 to the event recording part 121 of the management server 101.

The event aggregation apparatus 109 may have multiple layers or may have only one layer. The monitoring target events detected by the event monitors 108 may be directly transmitted to the event recording part 121 of the management server 101. Instead of the transmission of the monitoring target events from the event monitors 108, the event aggregation parts 110 may periodically inquire the event monitors 108 of the server apparatuses 103, the storage apparatuses 104, and the network apparatuses 105 to collect the detected monitoring target events.

Figure 4:
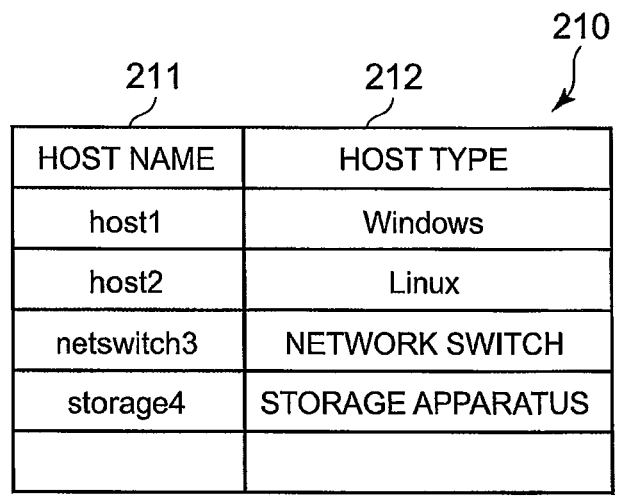
FIG. 4 is an example of a data structure and data of a management target list.

FIG. 4 is an example of a data structure and data of the management target list 210. As shown in FIG. 4, the management target list 210 is in a tabular format and comprises one or more rows. All rows have two columns. The two columns comprise a host name 211 and a host type 212. The rows of the management target list 210 may include other columns not shown, and some of the columns may not exist.

Host names and host types of the server apparatuses 103, the storage apparatuses 104, and the network apparatuses 105 as targets of the configuration changing operation are stored row by row in the management target list 210. The information stored in the management target list 210 may be created by manual operation of a system manager or the like or may be created using a certain tool or utilities.

FIG. 5 is an example of a data structure and data of the monitoring target event list 220. As shown in FIG. 5, the monitoring target event list 220 is in a tabular format and comprises one or more rows. All rows include four columns. The four columns comprise an event ID 221, a type 222, a host type 223, and a checking procedure 224. The checking procedure 224 further includes a set of a procedure name 225 and a procedure value 226. A plurality of sets of the procedure name 225 and the procedure value 226 may exist for one event ID. The rows of the monitoring target event list 220 may include other columns not shown, and some of the columns may not exist.

Information defining the monitoring target events to be detected by the individual apparatuses stored in the rows of the management target list 210 (FIG. 4) is stored row by row in the monitoring target event list 220. The data of the type 222 and the checking procedure 224 illustrated in FIG. 5 will be described here.

When the type 222 is "Creation of window", an action of displaying a window, which corresponds to a condition defined in the checking procedure 224, on an output apparatus not shown, such as a display, included in the server apparatus 103 is the target of monitoring. For example, in the row with the event ID 221 "1" in FIG. 5, an action of displaying a window, in which WindowClass is "StorageDriverInstaller", WindowTitle is "Storage driver & tool installer", and WindowText is "Welcome", is set as the monitoring target event. At least one of the WindowsClass, WindowTitle, and WindowText may be set as the condition of the checking procedure, or other conditions may be included in the checking procedure.

When the type 222 is "Disappearance of window", an action of disappearance of a window, which corresponds to a condition defined in the checking procedure 224, from the output apparatus of the server apparatus 103 is set as a target of monitoring. For example, in the row with the event ID 221 "2" in FIG. 5, an action of disappearance of a window, in which WindowClass is "StorageDriverInstaller", WindowTitle is "Storage driver & tool installer", and WindowText is "Installation start", is set as the monitoring target event.

When the type 222 is "Change in window message", an action of changing a message of the window displayed on the output apparatus of the server apparatus 103 to display a window corresponding to a condition defined in the checking procedure 224 is the target of monitoring. For example, in the row with the event ID 221 "3" in FIG. 5, an action of changing a message displayed in a window, in which WindowClass is "MessageBox", and WindowTitle is "Disk replacement", to "Switch to CD-ROM#2" indicated by WindowText is set as the monitoring target event. Other actions, such as an action of changing the window title, may be set as the monitoring target events.

When the type 222 is "Press of window button", an action of pressing a button (selected and operated by a mouse or the like), which corresponds to a condition defined in the checking procedure 224, in the window displayed on the output apparatus of the server apparatus 103 is set as the target of monitoring. For example, in the row with the event ID 221 "4" in FIG. 5, an action of pressing a button with "Next" in ButtonText included in a window, in which WindowClass is "MessageBox", WindowTitle is "Disk replacement", and "WindowText" is "Switch to CD-ROM#2", is set as the monitoring target event. At least one of the WindowsClass, WindowTitle, WindowText, and ButtonText may be set as the condition of the checking procedure, or other conditions may be included in the checking procedure.

When the type 222 is "Windows event log", an action in which the host type 212 (FIG. 4) of the server apparatus 103 is Windows (registered trademark), and an event log corresponding to a condition defined in the checking procedure 224 is created is set as the target of monitoring. For example, in the row with the event ID 221 "5" in FIG. 5, an action of creating an event log, in which type is "Warning", and message is "Link is disconnected", is set as the monitoring target event.

When the type 222 is "SNMP trap", an action of transmission of an SNMP (Simple Network Management Protocol) trap packet, which corresponds to a condition defined in the checking procedure 224, mainly from the network apparatus 105 is set as the target of monitoring. An action of transmission of the SNMP trap packet from the server apparatus 103 and the storage apparatus 104 may also be the target of monitoring. RFC (Request for Comment) 1157 describes details of the SNMP. For example, in the row with the event ID 221 "6" in FIG. 5, an action of transmission of an SNMP trap packet with generic-trap "2", i.e. LinkDown, from the network apparatus 105 is set as the monitoring target event.

When the type 222 is "Output of log file", an action of outputting log information, which corresponds to a condition defined in the checking procedure 224, to a file mainly on the server apparatus 103 is the target of monitoring. An action of outputting the log information to a file on the storage apparatus 104 and the network apparatus 105 may also be the target of monitoring. For example, in the row with the event ID 221 "7" in FIG. 5, an action of outputting a character string (pattern) "Accepted password for root" to a log file with file (file name) "/var/adm/syslog" is set as the monitoring target event.

When the type 222 is "CIM Indication", an action of outputting an indication of CIM (Common Information Model), which corresponds to a condition defined in the checking procedure 224, mainly from the storage apparatus 104 is set as the target of monitoring. An action of outputting an indication of CIM from the server apparatus 103 and the network apparatus 105 may also be the target of monitoring. Specifications of DMTF (Distributed Management Task Force) describe details of the CIM. For example, in the row with the event ID 221 "8" in FIG. 5, an action of outputting an indication of a CIM_InstCreation class including an instance of a CIM_StorageVolume class is set as the monitoring target event. This type of indication is mainly output when a new LU (Logical Unit) is created on the storage apparatus 104.

When the type 222 is "Creation of process", an action of creating a process, which corresponds to a condition defined in the checking procedure 224, mainly on the server apparatus 103 is set as the target of monitoring. For example, in the row with the event ID 221 "9" in FIG. 5, an action of creating a process with the process name "sp2install.exe" is set as the monitoring target event. A command name may be used in place of the process name, and a command line character string may be defined. Similarly, an action of disappearance of a process may also be set as the monitoring target event.

When the type 222 is "Execution of command", mainly the server apparatus 103 periodically executes a command designated in the checking procedure 224, and the execution result is set as the target of monitoring. Examples of the execution result include a value of a return code, a standard output, and a character string output to a standard error output. For example, in the row with the event ID 221 "10" in FIG. 5, a command "check.exe" is periodically executed, and an action in which the return code is "0" is set as the monitoring target event.

The type 222 may include information other than the information described above or may include none of the information described above. The information stored in the monitoring target event list 220 may be created by manual operation of the system manager or the like or may be created using a certain tool or utilities.

Figure 6:
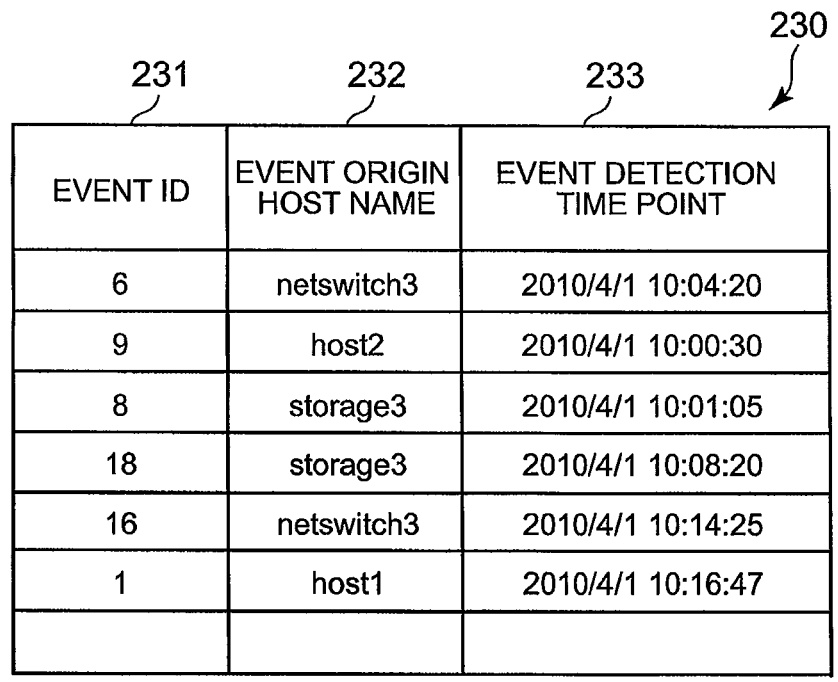
FIG. 6 is an example of a data structure and data of a detected event list.

FIG. 6 is an example of a data structure and data of the detected event list 230. As shown in FIG. 6, the detected event list 230 is in a tabular format and comprises one or more rows. All rows include three columns. The three columns comprise an event ID 231, an event origin host name 232, and an event detection time point 233. The rows of the detected event list 230 may include other columns not shown, and some of the columns may not exist.

On which of the server apparatus 103, the storage apparatus 104, and the network apparatus 105 and when the monitoring target events defined in the rows of the monitoring target event list 220 (FIG. 5) are detected are recorded row by row in the detected event list 230.

The event recording part 121 basically records the information stored in the detected event list 230. Part or all of the information stored in the detected event list 230 may be created by manual operation of the system manager or the like or may be created using a certain tool or utilities.

FIG. 7 is an example of a data structure and data of the operation list 240. As shown in FIG. 7, the operation list 240 is in a tabular format and includes one or more rows. All rows include six columns. The six columns comprise an operation ID 241, an operator name 242, a scheduled start time point 243, a scheduled end time point 244, an operation status 245, and an operation name 246. The rows of the operation list 240 may include other columns not shown, and some of the columns may not exist.

Information of a series of configuration changing operations for the server apparatus 103, the storage apparatus 104, and the network apparatus 105 is stored row by row in the operation list 240. On the assumption that a plurality of persons take charge of the series of operations, the operator name 242 illustrates team names in FIG. 7. Personal names may also be stored here. Necessary skill levels may also be stored so that anyone with specific skill levels can perform the operations.

The information stored in the operation list 240 may be created by manual operation of the system manager or the like or may be created using a certain tool or utilities.

FIG. 8 is an example of a data structure and data of the operation procedure list 250. As shown in FIG. 8, the operation procedure list 250 is in a tabular format and comprises one or more rows. All rows include nine columns. The nine columns comprise an operation ID 251, a procedure ID 252, a preliminary procedure ID 253, a manual procedure start event ID 254, a manual procedure end event ID 255, a target host name 256, a manual procedure scheduled time 257, an automatic procedure scheduled time 258, and operation details 259. The rows of the operation procedure list 250 may include other columns not shown, and some of the columns may not exist.

Information of individual operation procedures included in the series of operations stored in the rows of the operation list 240 (FIG. 7) is stored row by row in the operation procedure list 250. Each operation procedure comprises a set of a manual procedure and an automatic procedure. This is because an automatic procedure may arise as a result of a manual procedure. If there is no automatic procedure, the automatic procedure scheduled time 258 is "0:00" (0 minutes, 0 seconds).

The information stored in the operation procedure list 250 may be created by manual operation of the system manager or the like or may be created using a certain tool or utilities.

FIG. 9 is an example of a data structure and data of the manual procedure result list 270. As shown in FIG. 9, the manual procedure result list 270 is in a tabular format and comprises one or more rows. All rows include six columns. The six columns comprise a procedure ID 271, a manual procedure start time point 272, a manual procedure end time point 273, a manual procedure actual time 274, a manual procedure delay time 275, and a manual procedure estimated time 276. The rows of the manual procedure result list 270 may include other columns not shown, and some of the columns may not exist.

In the manual procedure result list 270, the actual start time point and end time point of operation of each manual procedure stored in each row of the operation procedure list 250 (FIG. 8) are stored in the manual procedure start time point 272 and the manual procedure end time point 273, respectively. The actual time for the operation of the manual procedure is calculated from the start time point and the end time point and is stored in the manual procedure actual time 274. Delay time calculated as a difference between the manual procedure scheduled time 257 acquired from the corresponding row of the operation procedure list 250 and the manual procedure actual time 274 is stored in the manual procedure delay time 275. Estimated time that would be required for manual procedures of incomplete manual procedures is stored in the manual procedure estimated time 276. FIG. 9 illustrates an example of data at a time point 2010/4/1 10:24:00 corresponding to the example of data shown in FIGS. 6 to 8.

The operation procedure list 250 and the manual procedure result list 270 correspond one to one based on the procedure ID 252 and the procedure ID 271. The operation detection part 122, the operation time specifying part 123, and the operation delay estimation part 124 basically record the information stored in the manual procedure result list 270. The information stored in the manual procedure result list 270 may be created by manual operation of the system manager or the like or may be created using a certain tool or utilities.

Figure 10:
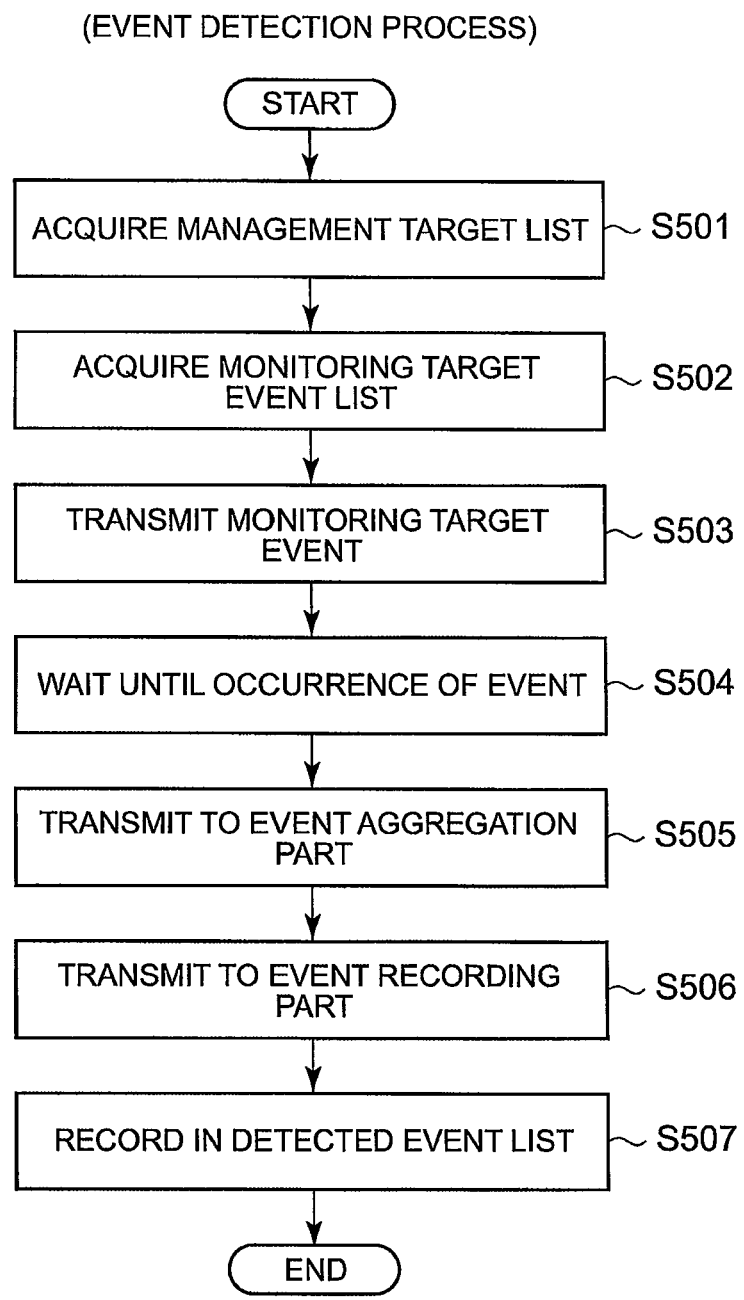
FIG. 10 is a flow chart showing a flow of an event detection process.

FIG. 10 is a flow chart showing a flow of an event detection process executed by the event detection indication part 120, the event recording part 121, the operation detection part 122, the event monitor 108, and the event aggregation part 110.

The event detection indication part 120 refers to the management target list 210 (FIG. 4) to acquire the list of the server apparatuses 103, the storage apparatuses 104, and the network apparatuses 105 in step S501 and refers to the monitoring target event list 220 (FIG. 5) to acquire the list of the monitoring target events in step S502. In step S503, the event detection indication part 120 transmits the monitoring target events acquired in step S502 to the event monitors 108 of the server apparatuses 103, the storage apparatuses 104, and the network apparatuses 105 acquired in step S501. In this case, the monitoring target events may be transmitted to the event monitors 108 of the apparatuses by narrowing down monitoring target events to the ones in which the host type 212 included in the management target list 210 and the host type 223 included in the monitoring target event list 220 match. The monitoring target events may be transmitted to the event monitors 108 through the event aggregation parts 110, instead of direct transmission to the event monitors 108.

In step S504, the event monitors 108 wait for actions corresponding to any of the monitoring target events transmitted from the event detection indication part 120 to occur. In place of the event monitors 108, the event aggregation parts 110 may periodically monitor the server apparatuses 103, the storage apparatuses 104, and the network apparatuses 105 and wait for actions corresponding to any of the monitoring target events to occur.

When an action corresponding to any of the monitoring target events is detected, the event monitor 108 transmits in step S505 the event ID (corresponding to the event ID 221 of FIG. 5) of the monitoring target event corresponding to the detected action and the host name (corresponding to the host name 211 of FIG. 4) of the apparatus, on which the event monitor 108 operates, to the event aggregation part 110 as a detected event. In place of the event monitor 108, the event aggregation part 110 may transmit the event ID of the monitoring target event detected by monitoring the apparatuses and the host name of the corresponding apparatus to the higher-level event aggregation part 110. Instead of the event aggregation part 110, the event ID and the host name may be directly transmitted to the event recording part 121. The host name may not be included in the detected event.

In step S506, the event aggregation part 110 transmits, to the event recording part 121, the detected event transmitted from the event monitor 108. If the event aggregation parts 110 are arranged in a layered structure as shown in FIG. 3, the detected events may be transmitted to the higher-level event aggregation parts 110, and the highest-level event aggregation part 110 may transmit the detected events to the event recording part 121.

In step S507, the event recording part 121 adds and records the event ID included in the detected event transmitted from the event monitor 108 or the event aggregation part 110 in the event ID 231 of the detected event list 230 (FIG. 5), adds and records the host name included in the detected event in the event origin host name 232, and adds and records the current time point acquired from the OS or the like in the event detection time point 233. The host name may be obtained from the source address of the packet transmitted from the event monitor 108, and the host name may be recorded in the event origin host name 232.

According to the series of processes from steps S501 to S507, information of in which apparatuses, what kind of events, and when the events occurred can be recorded in the detected event list 230 (FIG. 6) for all monitoring target events occurred in the server apparatuses 103, the storage apparatuses 104, and the network apparatuses 105.

Figure 11:
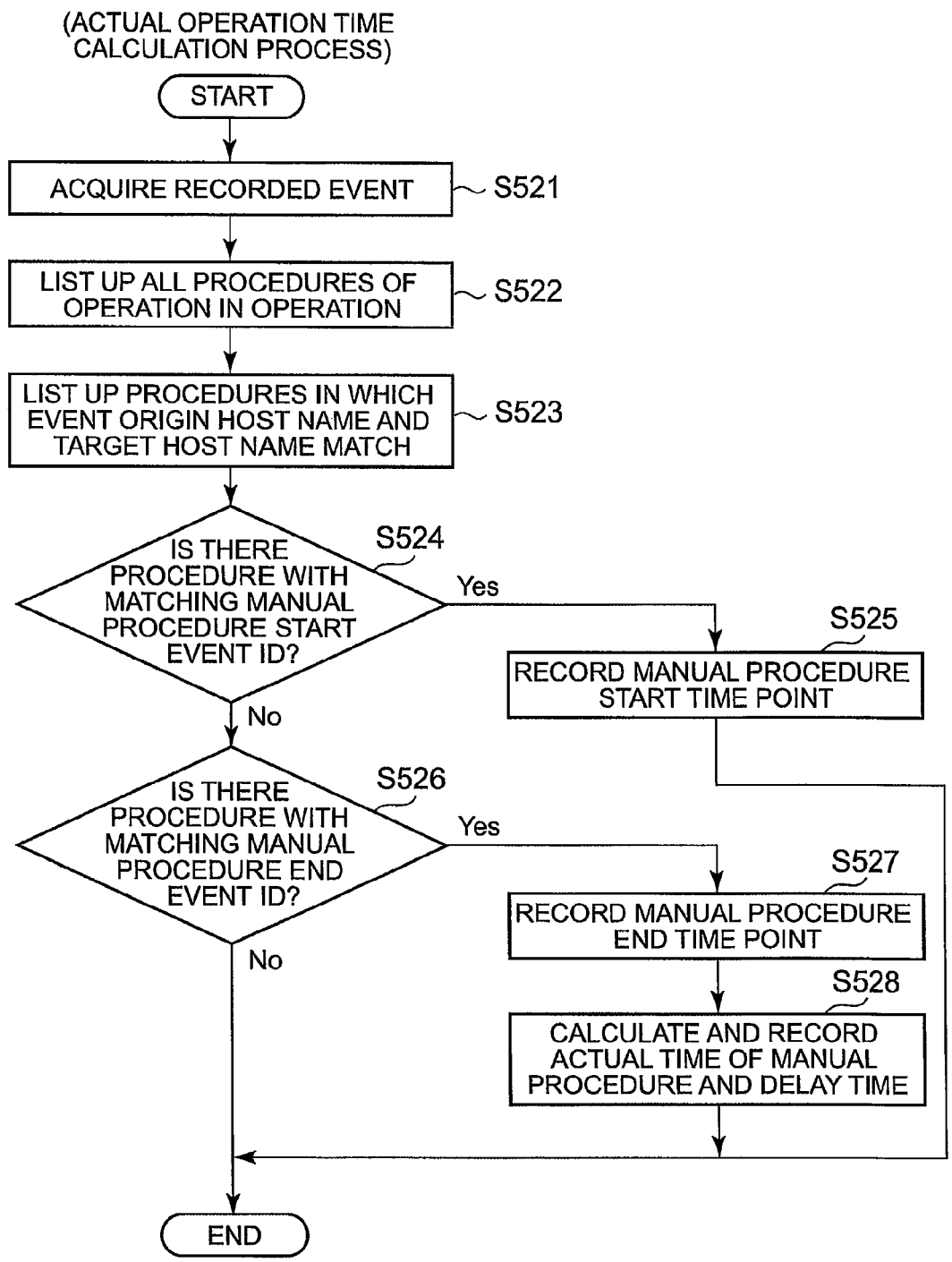
FIG. 11 is a flow chart showing a flow of an actual operation time calculation process.

FIG. 11 is a flow chart showing a flow of an actual time calculation process executed by the operation detection part 122 and the operation time specifying part 123. The process is executed every time a new detected event is added and recorded in the detected event list 230 (FIG. 6).

In step S521, the operation detection part 122 acquires the rows corresponding to the detected events added and recorded in the detected event list 230. In step S522, the operation detection part 122 acquires the operation ID 241 of the rows, in which the operation status 245 is "In operation", from the operation list 240 (FIG. 7) and lists up all rows with the operation ID 251 matching the operation ID 241 from the operation procedure list 250 (FIG. 8). In step S523, the operation detection part 122 lists up the rows with the target host name 256 matching the event origin host name 232 of the rows acquired in step S521, among the rows of the operation procedure list 250 acquired in step S522.

In step S524, the operation detection part 122 checks whether there is a row in which the manual procedure start event ID 254 matches the event ID 231 of the rows acquired in step S521, among the rows of the operation procedure list 250 acquired in step S523. If there is a row, ("Yes in step S524), the process proceeds to step S525. Otherwise ("No" in step S524), the process proceeds to step S526.

In step S525, the operation detection part 122 records the event detection time point 233 of the row acquired in step S521 in the manual procedure start time point 272 of the row with the procedure ID 271 of the manual procedure result list 270 (FIG. 9) matching the procedure ID 252 of the row of the operation procedure list 250 with the event ID matched in step S524, and the process ends.

In step S526, the operation detection part 122 checks whether there is a row with the manual procedure end event ID 255 matching the event ID 231 of the row acquired in step S521, among the rows of the operation procedure list 250 acquired in step S523. If there is a row ("Yes" in step S526), the process proceeds to step S527. Otherwise ("No" in step S526), the process ends.

In step S527, the operation detection part 122 records the event detection time point 233 of the row acquired in step S521 in the manual procedure end time point 273 of the row in which the procedure ID 271 of the manual procedure result list 270 (FIG. 9) matches the procedure ID 252 of the row of the operation procedure list 250 (FIG. 8) matching the event ID 231 checked in step S526.

In step S528, the operation time specifying part 123 calculates the difference between the manual procedure end time point 273 and the manual procedure start time point 272 of the row of the manual procedure result list 270 in which the manual procedure end time point 273 is recorded in step S527 and records the calculated value in the manual procedure actual time 274. At the same time, the operation time specifying part 123 acquires the manual procedure scheduled time 257 of the row in which the procedure ID 252 of the operation procedure list 250 matches the procedure ID 271 to calculate the difference between the manual procedure actual time 274 and the manual procedure scheduled time 257 and records the calculated value in the manual procedure delay time 275. If the manual procedure actual time 274 is smaller than the manual procedure scheduled time 257, "0:00" may be recorded in the manual procedure delay time 275 to avoid recording a negative time. Instead of calculating the difference between the manual procedure actual time 274 and the manual procedure scheduled time 257, a value may be calculated by dividing the manual procedure actual time 274 by the manual procedure scheduled time 257, and the value may be recorded as a manual procedure delay rate. If the manual procedure delay rate is less than 1, "1.0" may be set as the manual procedure delay rate.

Figure 12:
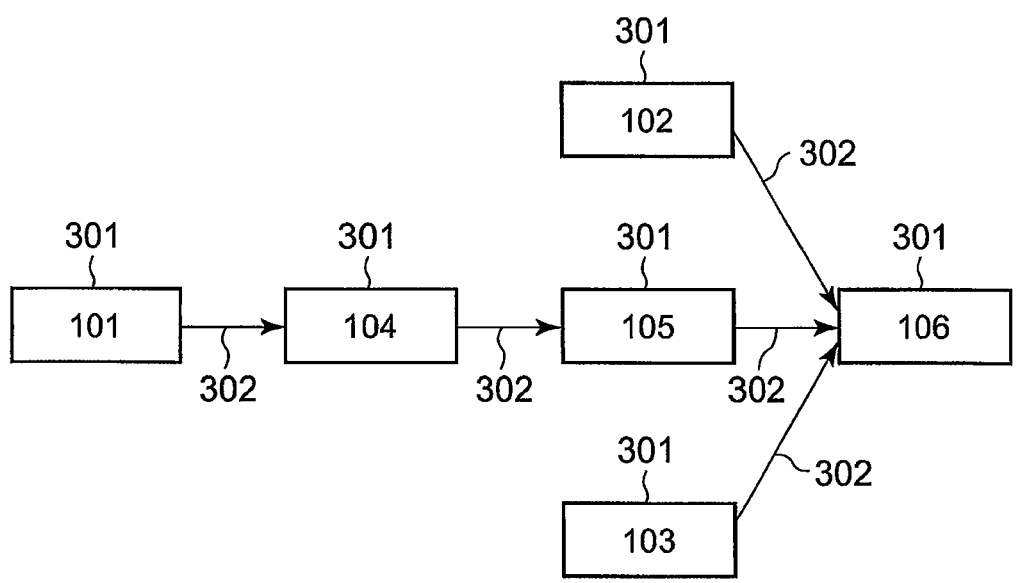
FIG. 12 is an example of a directed graph showing a dependence relationship in an execution order between operation procedures.

FIG. 12 is an example of a directed graph showing a dependence relationship in an execution order between a plurality of operation procedures comprising a certain operation. As illustrated in FIG. 12, the dependence relationship in the execution order between the operation procedures can be expressed by a directed graph including nodes 301 and links 302 indicating the operation procedures. The operation delay estimation part 124 creates the directed graph based on the procedure ID 252 and the preliminary procedure ID 253 in the operation procedure list 250 to estimate the delay time of incomplete operations in step S550 of the process of FIG. 14 described later.

FIG. 12 is an example of creation of a directed graph created when it is assumed that there is a dependence relationship in the execution order between six operation procedures with the operation ID "1" illustrated in FIG. 8. The example indicates that the operation procedures "101", "104", and "105" need to be executed in this order and that the operation procedure "106" needs to be executed after all of the operation procedures "102", "105", and "103" are finished.

Figure 13:
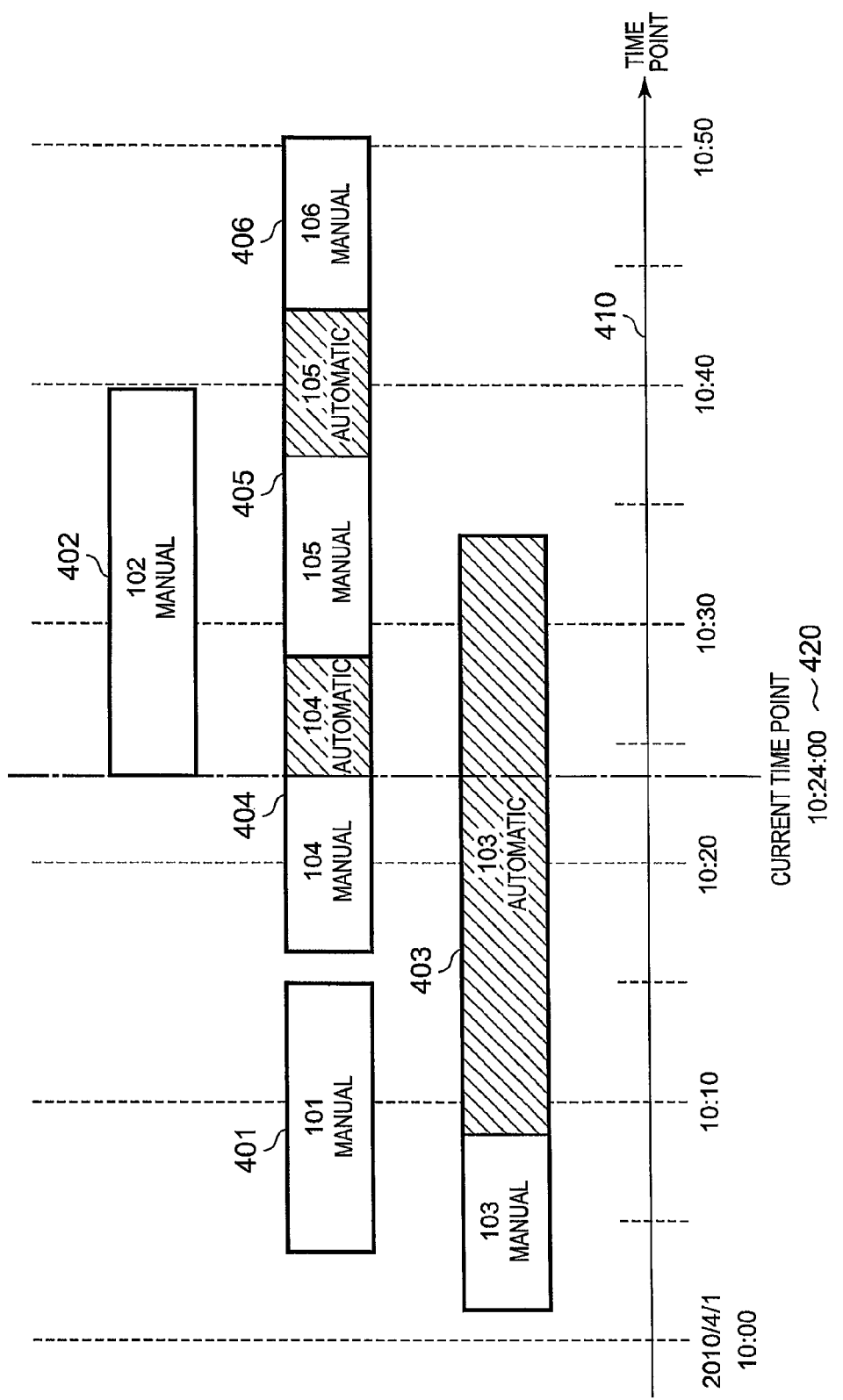
FIG. 13 is an example of a graph with the operation procedures arranged on a time axis.

FIG. 13 shows an example of expressing operation procedures comprising a certain series of operations as belt-shaped nodes with start time points at the left ends and with end time points or estimated end time points at the right ends and arranging the nodes on a time axis. The operation delay estimation part 124 arranges the nodes in steps S544, S546, and S550 of FIG. 14.

The operation procedures expressed as nodes are acquired from the operation procedure list 250 (FIG. 8) and the manual procedure result list 270 (FIG. 9). Each node comprises a set of a manual procedure and an automatic procedure. The manual procedure is on the left side, and the automatic procedure is on the right side. Each width indicates time it takes for the procedure or estimated time of the procedure. However, if the time it takes for the automatic procedure is "0:00", only the manual procedure is included.

The example of FIG. 13 shows a node arrangement of the operation procedures with the operation ID 251 "1" illustrated in FIGS. 8 and 9, when a current time point 420 is 2010/4/1 10:24:00.

For an operation procedure including a manual procedure in which the operation is finished at the current time point, the node is arranged by setting the time point of the manual procedure start time point 272 as the left end and setting the time point obtained by adding the automatic procedure scheduled time 258 to the manual procedure end time point 273 as the right end. This applies to a node 401 corresponding to the procedure ID "101" and a node 403 corresponding to the procedure ID "103". An example of the operation procedure with the procedure ID "103" will be described. In the operation procedure with the procedure ID "103", the manual procedure start time point 272 is "2010/4/1 10:01:05", the manual procedure end time point 273 is "2010/4/1 10:08:20", and the automatic procedure scheduled time 258 is "25:00". Therefore, as in the node 403, the node is arranged with 2010/4/1 10:01:05 as the left end and 2010/4/1 10:33:20 as the right end.

For an operation procedure including a manual procedure in operation at the current time point, it is assumed that the manual procedure is finished at the current time point. The node is arranged by setting the time point of the manual procedure start time point 272 as the left end of the node and setting a time point obtained by adding the automatic procedure scheduled time 258 to the current time point as the right end of the node. This applies to a node 404 corresponding to the procedure ID "104".

For an operation procedure including a manual procedure in which the operation is not started at the current time point, a time it will take for the operation (the manual procedure estimated time 276) is estimated from the amount of actual delay of the manual procedure up to this point, and the node is arranged according to the dependence relationship of FIG. 12. The left end of the node, i.e. the manual procedure start time point 272, is calculated from the dependence relationship of FIG. 12. A time point obtained by adding the manual procedure estimated time 276 and the automatic procedure scheduled time 258 to the calculated manual procedure start time point is set as the right end of the node. This applies to a node 402 corresponding to the procedure ID "102", a node 405 corresponding to the procedure ID "105", and a node 406 corresponding to the procedure ID "106".

Figure 14:
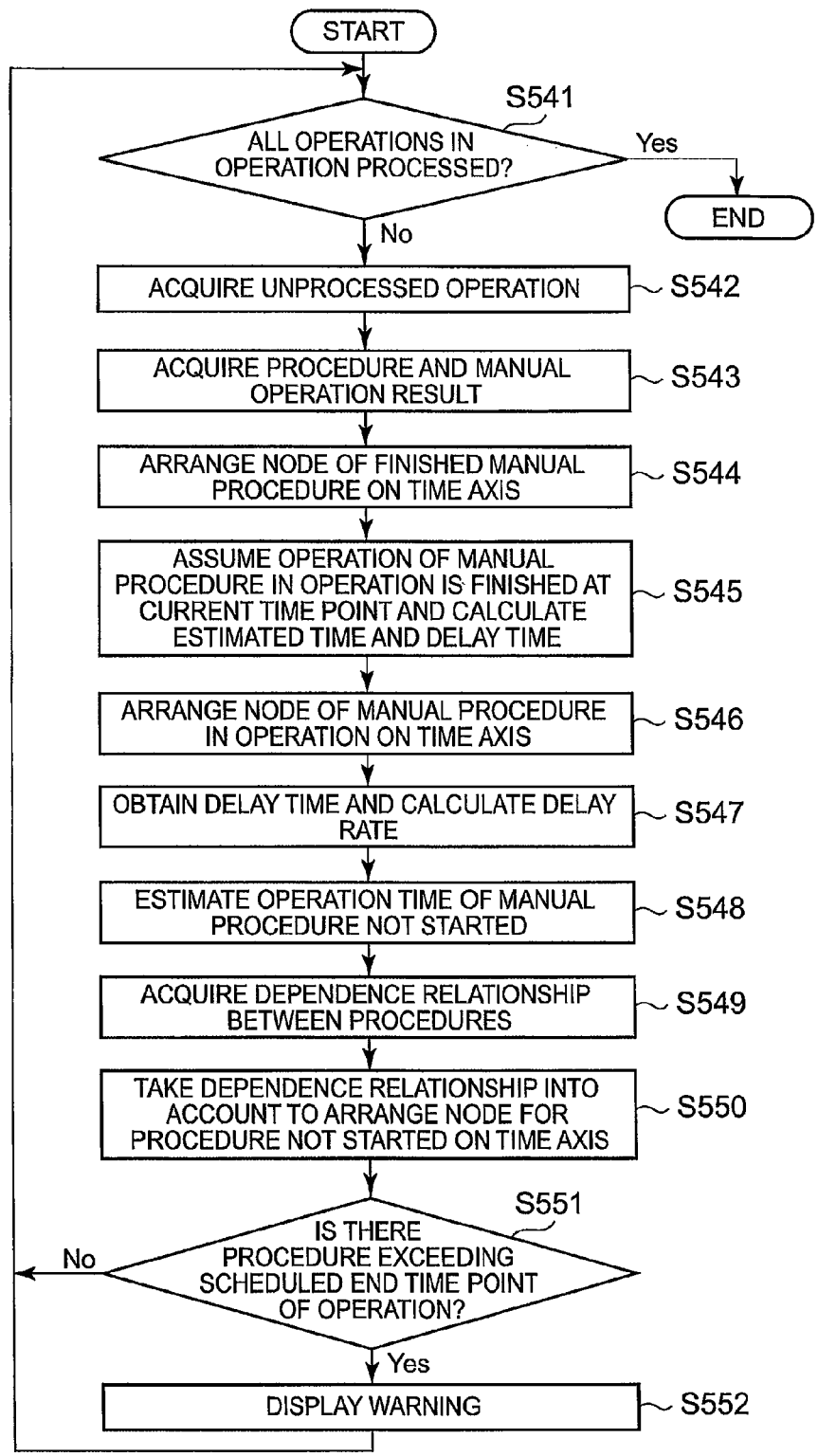
FIG. 14 is a flow chart showing a flow of an operation delay warning process.

FIG. 14 is a flow chart showing a flow of an operation delay monitoring process executed by the operation delay estimation part 124. The process is periodically executed, such as every one minute or every ten seconds.

In step S541, the operation delay estimation part 124 checks whether all operations with the operation status 245

"In operation" among the operations included in the operation list 240 (FIG. 7) are processed in step S542 and subsequent steps. If all operations are processed ("Yes" in step S541), the process ends. Otherwise ("No" in step S541), the process proceeds to step S542.

In step S542, the operation delay estimation part 124 acquires one unprocessed operation (which has not been extracted so far in step S542) among the operations with the operation status 245 "In operation" included in the operation list 240 (FIG. 7).

In step S543, the operation delay estimation part 124 acquires the operation procedures corresponding to the operation acquired in step S542 and manual procedure results corresponding to the operation procedures, from the operation procedure list 250 (FIG. 8) and the manual procedure result list 270 (FIG. 9).

In step S544, the operation delay estimation part 124 arranges operation procedures with completed manual procedures among the operation procedures acquired in step S543 on the time axis as nodes. The fact that the manual procedures are finished is determined by the fact that the manual procedure end time point 273 is recorded. This applies to the operation procedures with the procedure ID 271 "101" and "103" in the manual procedure result list 270 illustrated in FIG. 9. In the example of an operation procedure with the operation ID 251 "1" and with the current time point 2010/4/1 10:24:00, the nodes 401 and 403 of FIG. 13 are arranged in the present step.

In step S545, the operation delay estimation part 124 assumes that the operations of the operation procedures with the manual procedures in operation among the operation procedures acquired in step S543 are finished at the current time point to calculate the estimated time of the manual procedures and records the estimated time in the manual procedure estimated time 276. The fact that the manual procedure is in operation is determined by the fact that the manual procedure start time point 272 is recorded and that the manual procedure end time point 273 is not recorded. This applies to the operation procedures with the procedure ID 271 "104" and "201" in the manual procedure result list 270 illustrated in FIG. 9. The estimated time of the manual procedure is obtained by calculating the difference between the current time point and the manual procedure start time point 272.

At the same time, the operation delay estimation part 124 acquires the row corresponding to the operation procedure from the operation procedure list 250 to calculate the difference between the manual procedure estimated time 276 and the manual procedure scheduled time 257 and records the difference in the manual procedure delay time 275. If the difference between the manual procedure estimated time 276 and the manual procedure scheduled time 257 is negative, "0:00" may be recorded in the manual procedure delay time 275 to avoid recording a negative time. Instead of calculating the difference between the manual procedure estimated time 276 and the manual procedure scheduled time 257, the manual procedure estimated time 276 may be divided by the manual procedure scheduled time 257 to record the delay rate of the manual operation. If the delay rate is less than 1, "1" may be recorded as the delay rate.

In step S546, the operation delay estimation part 124 arranges an operation procedure including the manual procedure in operation, for which the estimated time and the delay time are calculated in step S545, on the time axis as a node. In the example of the operation procedure with the operation ID 251 "1" and with the current time point 2010/4/1 10:24:00 illustrated in FIGS. 8 and 9, the node 404 of FIG. 13 is arranged in the present step.

In step S547, the operation delay estimation part 124 calculates the delay rate from the delay time of all nodes arranged in steps S544 and S545, i.e. all manual procedures that are finished or in operation. In the example of the operation procedure with the operation ID 251 "1" and with the current time point 2010/4/1 10:24:00 illustrated in FIGS. 8 and 9, the calculated delay rate is (5:05+2:15+2:13)/(5:00+5:00+5:00)=9:33/15:00≈0.637. Although the total delay time is divided by the total scheduled time to calculate the delay rate, the delay rates of individual manual procedures may be calculated to obtain arithmetic means, geometric means, or harmonic means of the delay rates. The manual procedures in operation may be excluded from the calculation target of the delay rate.

In step S548, the operation delay estimation part 124 estimates the operation time it will take for a manual procedure of an operation procedure including a manual procedure not started among the operation procedures acquired in step S543. The fact that the manual procedure is not started is determined by the fact that the manual procedure start time point 272 is not recorded. The estimated operation time it will take for the manual procedure is calculated by adding estimated delay time, which is calculated by multiplying the manual procedure scheduled time 257 by the delay rate calculated in step S547, to the original manual procedure scheduled time 257. The calculated estimated operation time is recorded in the manual procedure estimated time 276. In the example of the manual procedure with the procedure ID 271 "102" and with the current time point 2010/4/1 10:24:00 illustrated in FIG. 9, the calculated estimated operation time is 10:00+10:00×0.637=16:22.

In step S549, the operation delay estimation part 124 acquires the dependence relationship in the execution order between the operation procedures for the operation procedures including the manual procedures that are not started, for which the operation time is estimated in step S548. This is performed by acquiring a set of the procedure ID 252 and the preliminary procedure ID 253 from the operation procedure list 250 (FIG. 8).

In step S550, the operation delay estimation part 124 arranges, on the time axis, the nodes for the operation procedures including the manual procedures that are not started based on the dependence relationship acquired in step S549 and the manual procedure estimated time 276 recorded in step S548. In the example of the operation procedures with the operation ID 251 "1" and with the current time point 2010/4/1 10:24:00 illustrated in FIGS. 8 and 9, the nodes 402, 405, and 406 of FIG. 13 are arranged in the present step. Since the operation procedure with the procedure ID 252 "102" (corresponding to the node 402) does not have a preliminary procedure ID, the node 402 is arranged by setting the current time point 420 as the left end. The preliminary procedure ID 253 of the operation procedure with the procedure ID 252 "105" (corresponds to the node 405) is "104", and the operation procedure depends on the operation procedure with the procedure ID 252 "104" (corresponds to the node 404). Therefore, the node 405 is arranged just to the right of the node 404. The operation procedure with the procedure ID 252 "106" (corresponds to the node 406) depends on three operation procedures with the procedure ID 252 "102", "103", and "105" (corresponds to the nodes 402, 403, and 405, respectively). Therefore, the node 406 is arranged just to the right of the node 405 corresponding to the operation procedure that ends at the latest (the right end of the node is farthest to the right) among the nodes.

In step S551, the operation delay estimation part 124 checks whether any of the operation procedures corresponding to the nodes arranged on the time axis in steps S544, S546, and S550 exceeds the scheduled end time point 244 of the operation acquired in step S542. In this case, whether the right ends of the nodes arranged as in FIG. 13 are on the right side of the scheduled end time point 244 is checked. If there is an exceeding operation procedure ("Yes" in step S551), the process proceeds to step S552. Otherwise ("No" in step S551), the process returns to step S541 to repeat the process.

In step S552, the operation delay estimation part 124 outputs, to the output apparatus 204 of the management server 101, a warning display indicating that there is a high possibility that the operation will not end before the scheduled end time point due to the operation delay up to the current time. In this case, the operation details 259, estimated operation end time, and the like may also be output together.

As described, according to the first embodiment, the high possibility that the configuration changing operation of the computer system will not end before the scheduled end time point due to delay can be predicted, and the high possibility can be alerted to the system manager or the like.

Second Embodiment

Another embodiment (hereinafter, called "second embodiment") as a modification of the first embodiment will be described.

Figure 15:
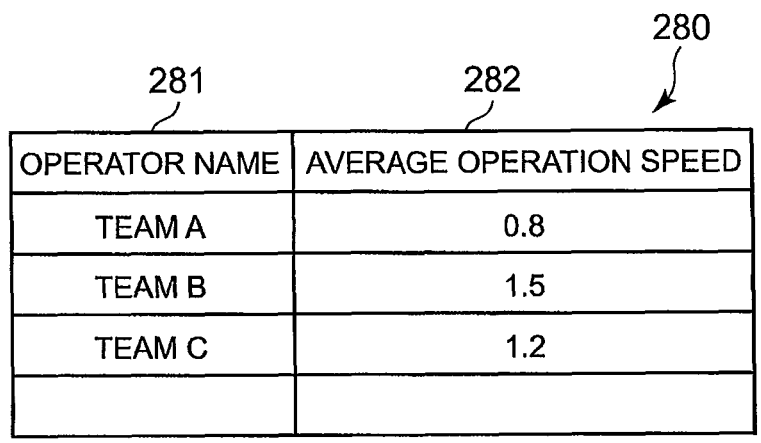
FIG. 15 is an example of a data structure and data of an operator list.

FIG. 15 is an example of a data structure and data of the operator list 280 according to the second embodiment. As shown in FIG. 15, the operator list 280 is in a tabular format and comprises one or more rows. All rows include two columns. The two columns comprise an operator name 281 and an average operation speed 282. The rows of the operator list 280 may include other columns not shown, and some of the columns may not exist.

Figure 16:
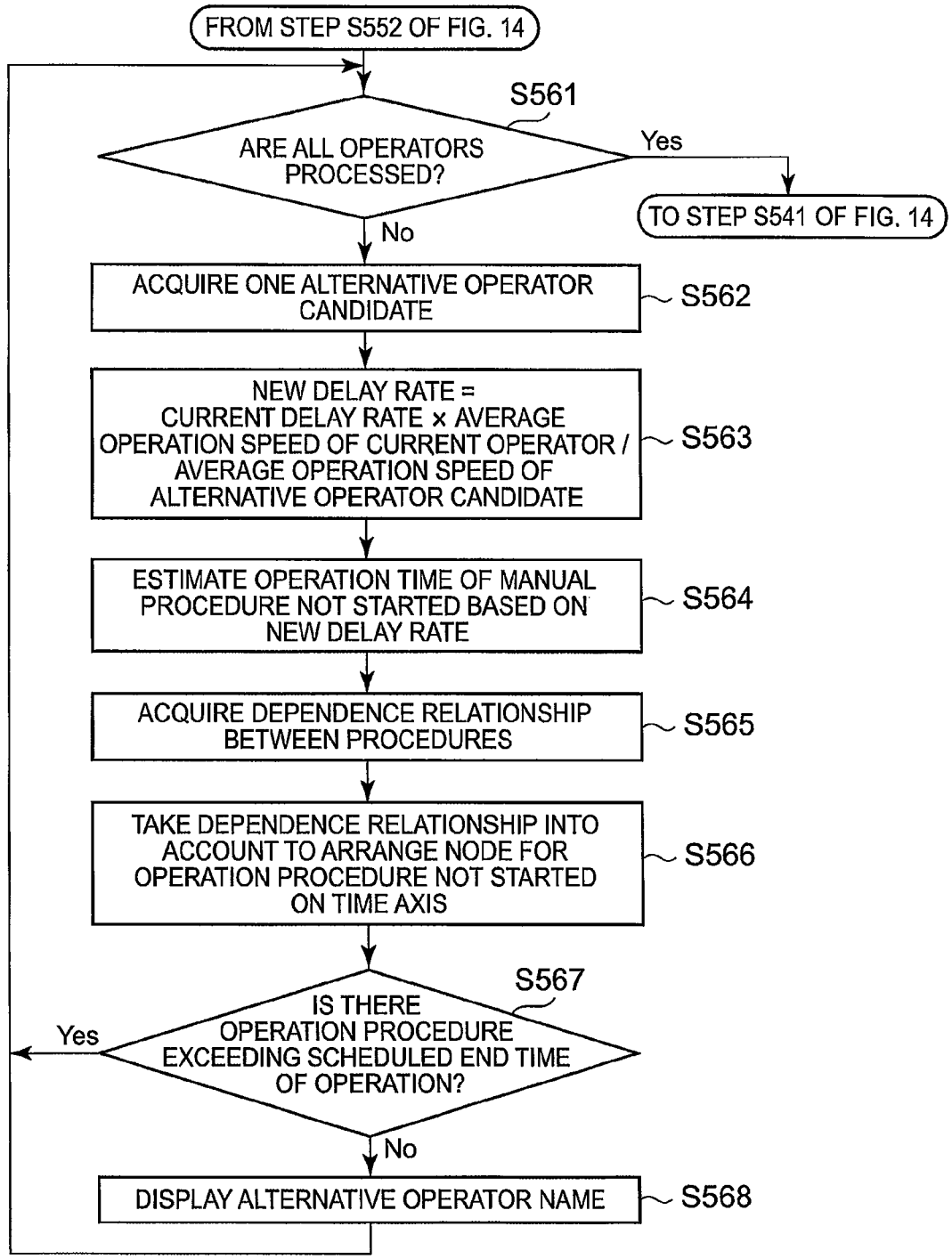
FIG. 16 is a flow chart showing a flow of an alternative operator display process.

FIG. 16 is a flow chart showing a flow of an alternative operator specifying process executed by the alternative operator specifying part 125 according to the second embodiment. The process is executed between steps S552 and S541 of FIG. 14.

In step S561, the alternative operator specifying part 125 checks whether all operator names 281 included in the operator list 280 are processed in step S562 and subsequent steps. If all operator names 281 are processed ("Yes" in step S561), the process proceeds to step S541 of FIG. 14. Otherwise ("No" in step S561), the process proceeds to step S562.

In step S562, the alternative operator specifying part 125 acquires one alternative operator candidate as an operator name 281 that has not been extracted so far, from the operator list 280.

In step S563, the alternative operator specifying part 125 uses the following formula to calculate a new delay rate as an estimated delay rate of the alternative operator candidate based on the current delay rate as the delay rate of the manual procedure calculated in step S547, based on the average operation speed 282 of the current operator, and based on the average operation speed 282 of the alternative operator candidate acquired in step S562.

New delay rate=current delay rate×average operation speed of current operator/average operation speed of alternative operator candidate In step S564, the alternative operator specifying part 125 uses the new delay rate calculated in step S563 to execute the same process as in step S548 (FIG. 14) to estimate the time it will take for the manual operation and records the time in the manual procedure estimated time 276 (FIG. 9).

In steps S565 and S566, the alternative operator specifying part 125 executes the same process as in step S549 and S550, respectively, to arrange the nodes on the time axis.

In step S567, the alternative operator specifying part 125 checks whether any of the operation procedures corresponding to the nodes arranged on the time axis in steps S544, S546, and S556 exceeds the scheduled end time point 244 of the operation acquired in step S542. In this case, whether the right ends of the nodes arranged as in FIG. 13 are on the right side of the scheduled end time point 244 is checked. If there is an exceeding operation procedure ("Yes" in step S567), the process returns to step S561 to select another alternative operator candidate. Otherwise ("No" in step S567), the process proceeds to step S568.

In step S568, the alternative operator specifying part 125 displays, as a recommended alternative operator, the operator name 281 of the alternative operator candidate acquired in step S562 on the output apparatus 204 of the management server 101.

As described, according to the second embodiment, the system manager or the like can be notified of which operator can replace the operator to perform the operation to increase the possibility of making up for the delay when it is predicted that the there is a high possibility that the configuration changing operation of the computer system will not end before the scheduled end time point due to delay.

Third Embodiment

Another embodiment (hereinafter, called "third embodiment") as a modification of the first or second embodiment will be described.

Figure 17:
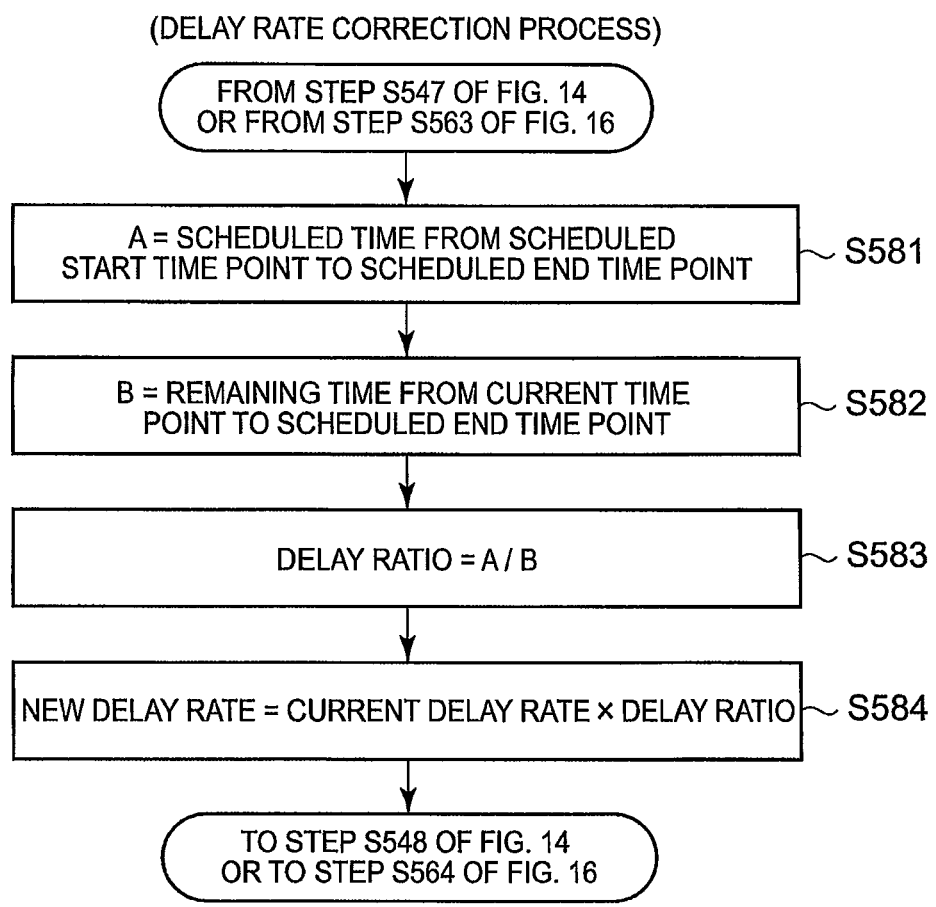
FIG. 17 is a flow chart showing a flow of a delay rate correction process.

FIG. 17 is a flow chart showing a flow of a delay rate correction process executed by the operation delay estimation part 124 according to the third embodiment. The process is executed between steps S547 and S548 of FIG. 14 or between steps S563 and S564 of FIG. 16.

In step S581, the operation delay estimation part 124 calculates scheduled time that is a difference between the scheduled end time point 244 and the scheduled start time point 243 of the operation acquired in step S542 (FIG. 14), and the scheduled time is defined as A. In step S582, the operation delay estimation part 124 calculates remaining time that is a difference between the scheduled end time point 244 and the current time point, and the remaining time is defined as B.

In step S583, the operation delay estimation part 124 divides A by B to obtain a delay ratio. For example, the following is calculation of the delay ratio of the operation with the operation ID 241 "1" in FIG. 7.

When the current time point is 2010/4/1 10:10:00, the delay ratio is 50/40=1.25. When the current time point is 2010/4/1 10:20:00, the delay ratio is 50/30≈1.67. When the current time point is 2010/4/1 10:30:00, the delay ratio is 50/20=2.5. When the current time point is 2010/4/1 10:40:00, the delay ratio is 50/10=5. When the current time point is 2010/4/1 10:45:00, the delay ratio is 50/5=10.

In this way, as the current time point approaches the scheduled end time point 244, the delay ratio increases at an accelerated rate.

In step S584, the operation delay estimation part 124 handles the delay rate calculated in step S547 of FIG. 14 or in step S563 of FIG. 16 as the current delay rate to calculate a new delay rate by the following formula.

New delay rate=current delay rate×delay ratio

The calculated new delay rate is used to execute the process of step S548 and subsequent steps of FIG. 14 or the process of step S564 and subsequent steps of FIG. 16.

The scheduled start time point 243 may be subtracted from the current time point to obtain an elapsed time C in step S582, and a result obtained by dividing C by B may be set as the delay ratio in step S583. For example, the following is calculation of the delay ratio of the operation with the operation ID 241 "1" in FIG. 7 based on the method.

When the current time point is 2010/4/1 10:10:00, the delay ratio is 10/40=0.25. When the current time point is 2010/4/1 10:20:00, the delay ratio is 20/30≈0.67. When the current time point is 2010/4/1 10:30:00, the delay ratio is 30/20=1.5. When the current time point is 2010/4/1 10:40:00, the delay ratio is 40/10=4. When the current time point is 2010/4/1 10:45:00, the delay ratio is 45/5=9.

In this way, the delay time can be estimated small when the current time point is before the midpoint between the scheduled start time point 243 and the scheduled end time point 244, and the delay time can be estimated large at an accelerated rate as the current time point approaches the scheduled end time point 244.

As described, according to the third embodiment, the delay ratio can be reduced to permit a relatively long delay if only a short time has passed after the start of the operation when the manual operation is delayed, and the delay ratio can be increased to permit only a shorter delay if the operation is close to the end.

Fourth Embodiment

Lastly, another embodiment (hereinafter, called "fourth embodiment") as a further modification of the three embodiments will be described.

FIG. 18 is a flow chart showing a flow of an operation procedure error warning process executed by the operation procedure error specifying part 126 according to the fourth embodiment of the present invention. The process is executed between steps S524 and S525 and between steps S526 and S527 of FIG. 11.

In step S530, the operation procedure error specifying part 126 checks whether all operation procedures indicated by the preliminary procedure ID 253 (FIG. 8) are finished for the operation procedure in which the manual procedure start event ID is matched in step S524. This is performed by checking the manual procedure result list 270 (FIG. 9) for all procedure IDs stored in the preliminary procedure ID 253 and checking whether all manual procedure end time points 273 are stored. If the operation procedures are all finished ("Yes" in step S530), the process proceeds to step S525 of FIG. 11. Otherwise ("No" in step S530), the process proceeds to step S531.

In step S531, the operation procedure error specifying part 126 outputs a warning indicating that the operation procedure is wrong to the output apparatus 204 of the management server 101. In this case, part or all of the details of the operation procedures matched in step S524 may be output. The operation procedures with the same operation ID 251 as the operation procedures matched in step S524 may be acquired from the operation procedure list 250 (FIG. 8), and part or all of the operation procedures may be output.

In step S532, the operation procedure error specifying part 126 checks whether the manual procedure start time point 272 (FIG. 9) is recorded for the manual procedure with the manual procedure end event ID matched in step S526. If the manual procedure start time point 272 is recorded ("Yes" in step S532), the process proceeds to step S527 of FIG. 11. Otherwise ("No" in step S532), the process proceeds to step S533. In step S533, the operation procedure error specifying part 126 executes the same process as in step S531.

An example of a case of an operation procedure error in the operation with the operation ID 251 "1" and with the current time point 2010/4/1 10:24:00 illustrated in FIGS. 8 and 9 will be illustrated. The execution results of the manual procedures at the current time point 2010/4/1 10:24:00 are as illustrated in FIG. 9. At this point, two operation procedures with the procedure ID 271 "104" and "105" are not finished yet. Therefore, two operation procedures with the procedure ID 252 "105" and "106" that depend on the two operation procedures cannot be started. Therefore, if host1 detects an event ID with the manual procedure start event ID 254 "3" or "9" of the two operation procedures, it is determined that the operation procedure is wrong, and a warning is output.

Three operation procedures with the procedure ID 271 "102", "105", and "106" are not started yet. Therefore, these three operation procedures should not be finished. Thus, if host1 detects an event ID with the manual procedure end event ID 255 "22", "4", or "19" of these three operation procedures, it is determined that the operation procedure is wrong, and a warning is output.

As described, according to the fourth embodiment, the system manager or the like can be notified of an error in the execution order when the operator makes a mistake in the execution order of the operation procedures. Therefore, this type of error can be more quickly handled, and as a result, an increase in the operation delay can be prevented.

This completes the description of the embodiments for carrying out the present invention. However, the embodiments of the present invention are not limited to these, and various changes are possible without departing from the scope of the present invention.

REFERENCE SIGNS LIST 101 management server (operation management apparatus)
103 server apparatus
104 storage apparatus
105 network apparatus
108 event monitor
109 event aggregation apparatus
110 event aggregation part
120 event detection indication part
121 event recording part
122 operation detection part (detection means of manual procedure operation)
123 operation time specifying part (operation time specifying means)
124 operation delay estimation part (operation delay estimation means)
125 alternative operator specifying part (alternative operator specifying means)
126 operation procedure error specifying part (operation procedure error specifying means)
210 management target list
220 monitoring target event list
230 detected event list
240 operation list
250 operation procedure list
270 manual procedure result list
280 operator list

The invention claimed is:

1. An operation delay monitoring method of monitoring, by an operation management apparatus comprising a storage part and a processing part, a delay in an operation for configuring a computer system including at least one of management target resources among server apparatuses, storage apparatuses, and network apparatuses or for changing a configuration of a configured computer system, wherein
the operation comprises one or more operation procedures having a dependence relationship in an execution order, an operation end time limit is designated for the operation, and each of the operation procedures may include a manual procedure manually performed by an operator as well as an automatic procedure automatically executed by the management target resources following the manual procedure,
the storage part is configured to store various pieces of information related to the operation and the operation procedures, the information including:
the dependence relationship in the execution order;
the operation end time limit;
a manual procedure scheduled time scheduled for execution of the manual procedure;
an automatic procedure scheduled time scheduled for execution of the automatic procedure; and
an event for specifying start and end of the manual procedure among actions that occur in the management target resources as a result of execution of the operation procedures, and
the processing part is configured to execute an operation delay monitoring process comprising:
a step of recording a start time point or an end time point of the manual procedure when the event for specifying the start and the end of the manual procedure occurs among the actions that occur in the management target resources as a result of the execution of the operation procedures;
a step of calculating a delay rate of the manual procedure up to this point based on the start time point and the end time point of the manual procedure in which the operation is already finished, and based on the manual procedure scheduled time;
a step of multiplying the manual procedure scheduled time of the manual procedure by the delay rate to calculate an estimated time for the execution of the manual procedure in which the operation is not started; and
a step of determining whether the operation will end before the operation end time limit based on the dependence relationship in the execution order, the estimated time, and the automatic procedure scheduled time.

2. An operation delay monitoring method according to claim 1, wherein
the storage part is further configured to store an average operation speed of each operator who is in charge of the operation, and
the operation delay monitoring process further comprises:
if it is determined that the operation will not end before the operation end time limit, a step of calculating a new delay rate when another operator performs the rest of the operation, based on the delay rate and based on the average operation speeds of the current operator and the other operator; and
a step of determining whether the operation will end before the operation end time limit when the other operator performs the rest of the operation, based on the dependence relationship in the execution order, the estimated time, and the automatic procedure scheduled time.

3. An operation delay monitoring method according to claim 2, wherein
the operation delay monitoring process further comprises a step of applying a correction process to the delay rate to increase the delay rate as the current time approaches the operation end time limit.

4. An operation delay monitoring method according to claim 2, wherein
the operation delay monitoring process further comprises a step of notifying an error in the execution order of the manual procedure by detecting an event that does not conform to the dependence relationship in the execution order or to an order relationship in the start and the end of the manual procedure when the event for specifying the start and the end of the manual procedure occurs.

5. An operation delay monitoring method according to claim 1, wherein
the operation delay monitoring process further comprises a step of applying a correction process to the delay rate to increase the delay rate as the current time approaches the operation end time limit.

6. An operation delay monitoring method according to claim 5, wherein
in the step of applying the correction process to the delay rate,
the delay rate is corrected by multiplying the delay rate by a delay ratio calculated from the start time point of the operation, the operation end time limit, and a current time point.

7. An operation delay monitoring method according to claim 1, wherein
the operation delay monitoring process further comprises a step of notifying an error in the execution order of the manual procedure by detecting an event that does not conform to the dependence relationship in the execution order or to an order relationship in the start and the end of the manual procedure when the event for specifying the start and the end of the manual procedure occurs.

8. An operation management apparatus comprising a storage part and a processing part, the operation management apparatus being configured to monitor a delay in an operation for configuring a computer system including at least one of management target resources among server apparatuses, storage apparatuses, and network apparatuses or for changing a configuration of a configured computer system, wherein
the operation comprises one or more operation procedures having a dependence relationship in an execution order, an operation end time limit is designated for the operation, and each of the operation procedures may include a manual procedure manually performed by an operator as well as an automatic procedure automatically executed by the management target resources following the manual procedure,
the storage part is configured to store various pieces of information related to the operation and the operation procedures, the information including:
the dependence relationship in the execution order;
the operation end time limit;
a manual procedure scheduled time scheduled for execution of the manual procedure;
an automatic procedure scheduled time scheduled for execution of the automatic procedure; and
an event for specifying start and end of the manual procedure among actions that occur in the management target resources as a result of execution of the operation procedures, and
the processing part comprises:
detection means of a manual procedure operation for recording a start time point or an end time point of the manual procedure when the event for specifying the start and the end of the manual procedure occurs among the actions that occur in the management target resources as a result of the execution of the operation procedures;

operation time specifying means for calculating an actual time required for the execution of the manual procedure based on the start time point and the end time point of the manual procedure in which the operation is already finished; and operation delay estimation means for calculating a delay rate of the manual procedure up to this point based on the actual time of the manual procedure in which the operation is already finished, and based on the manual procedure scheduled time, multiplying the manual procedure scheduled time of the manual procedure by the delay rate to calculate an estimated time for the execution of the manual procedure in which the operation is not started, and determining whether the operation will end before the operation end time limit based on the dependence relationship in the execution order, the estimated time, and the automatic procedure scheduled time.

9. An operation management apparatus according to claim 8, wherein the storage part is further configured to store an average operation speed of each operator who is in charge of the operation, and the processing part further comprises:

alternative operator specifying means for calculating, if it is determined that the operation will not end before the operation end time limit, a new delay rate when another operator performs the rest of the operation, based on the delay rate and based on the average operation speeds of the current operator and the other operator and determining whether the operation will end before the operation end time limit when the other operator performs the rest of the operation, based on the dependence relationship in the execution order, the estimated time, and the automatic procedure scheduled time.

10. An operation management apparatus according to claim 9, wherein the processing part further comprises correction means for applying a correction process to the delay rate to increase the delay rate as the current time approaches the operation end time limit.

11. An operation management apparatus according to claim 9, wherein the processing part further comprises operation procedure error specifying means for notifying an error in the execution order of the manual procedure by detecting an event that does not conform to the dependence relationship in the execution order or to an order relationship in the start and the end of the manual procedure when the event for specifying the start and the end of the manual procedure occurs.

12. An operation management apparatus according to claim 8, wherein the processing part further comprises correction means for applying a correction process to the delay rate to increase the delay rate as the current time approaches the operation end time limit.

13. An operation management apparatus according to claim 12, wherein the correction means for applying the correction process to the delay rate is configured to correct the delay rate by multiplying the delay rate by a delay ratio calculated from the start time point of the operation, the operation end time limit, and a current time point.

14. An operation management apparatus according to claim 8, wherein the processing part further comprises operation procedure error specifying means for notifying an error in the execution order of the manual procedure by detecting an event that does not conform to the dependence relationship in the execution order or to an order relationship in the start and the end of the manual procedure when the event for specifying the start and the end of the manual procedure occurs.

15. An operation management program causing a computer to function as an operation management apparatus, the operation management apparatus comprising a storage part and a processing part, the operation management apparatus being configured to monitor a delay in an operation for configuring a computer system including at least one of management target resources among server apparatuses, storage apparatuses, and network apparatuses or for changing a configuration of a configured computer system, wherein the operation comprises one or more operation procedures having a dependence relationship in an execution order, an operation end time limit is designated for the operation, and each of the operation procedures may include a manual procedure manually performed by an operator as well as an automatic procedure automatically executed by the management target resources following the manual procedure, the storage part is configured to store various pieces of information related to the operation and the operation procedures, the information including:

the dependence relationship in the execution order;

the operation end time limit;

a manual procedure scheduled time scheduled for execution of the manual procedure;

an automatic procedure scheduled time scheduled for execution of the automatic procedure; and an event for specifying start and end of the manual procedure among actions that occur in the management target resources as a result of execution of the operation procedures, and the processing part comprises:

detection means of a manual procedure operation for recording a start time point or an end time point of the manual procedure when the event for specifying the start and the end of the manual procedure occurs among the actions that occur in the management target resources as a result of the execution of the operation procedures;

operation time specifying means for calculating an actual time required for the execution of the manual procedure based on the start time point and the end time point of the manual procedure in which the operation is already finished; and operation delay estimation means for calculating a delay rate of the manual procedure up to this point based on the actual time of the manual procedure in which the operation is already finished, and based on the manual procedure scheduled time, multiplying the manual procedure scheduled time of the manual procedure by the delay rate to calculate an estimated time for the execution of the manual procedure in which the operation is not started, and determining whether the operation will end before the operation end time limit based on the dependence relationship in the execution order, the estimated time, and the automatic procedure scheduled time.

16. An operation management program according to claim 15, wherein the storage part is further configured to store an average operation speed of each operator who is in charge of the operation, and the processing part further comprises:

alternative operator specifying means for calculating, if it is determined that the operation will not end before the operation end time limit, a new delay rate when another operator performs the rest of the operation, based on the delay rate and based on the average operation speeds of the current operator and the other operator and determining whether the operation will end before the operation end time limit when the other operator performs the rest of the operation, based on the dependence relationship in the execution order, the estimated time, and the automatic procedure scheduled time.

* * * * *